(12) United States Patent
Gurin

(10) Patent No.: US 9,488,982 B2
(45) Date of Patent: Nov. 8, 2016

(54) SYSTEMS FOR A SHARED VEHICLE

(71) Applicant: Michael H Gurin, Glenview, IL (US)

(72) Inventor: Michael H Gurin, Glenview, IL (US)

( * ) Notice: Subject to any disclaimer, the term of this patent is extended or adjusted under 35 U.S.C. 154(b) by 0 days.

(21) Appl. No.: 14/749,634

(22) Filed: Jun. 25, 2015

(65) Prior Publication Data

US 2015/0370253 A1    Dec. 24, 2015

Related U.S. Application Data

(63) Continuation-in-part of application No. 13/757,815, filed on Feb. 3, 2013, now abandoned.

(51) Int. Cl.
| | | |
|---|---|---|
| *G05D 1/00* | (2006.01) | |
| *H04N 7/18* | (2006.01) | |
| *G06Q 10/02* | (2012.01) | |
| *B60W 50/08* | (2012.01) | |

(52) U.S. Cl.
CPC .......... *G05D 1/0088* (2013.01); *B60W 50/085* (2013.01); *G06Q 10/02* (2013.01); *H04N 7/185* (2013.01)

(58) Field of Classification Search
CPC . G05D 1/0088; B60W 50/085; G06Q 10/02; H04N 7/185
See application file for complete search history.

(56) References Cited

U.S. PATENT DOCUMENTS

| | | | | |
|---|---|---|---|---|
| 6,400,835 B1 * | 6/2002 | Lemelson | ............ | B60Q 1/0023 307/10.5 |
| 6,485,081 B1 * | 11/2002 | Bingle | ............ | B60Q 3/06 292/DIG. 43 |
| 6,853,894 B1 * | 2/2005 | Kolls | ............ | G01M 17/007 340/426.36 |
| 7,082,359 B2 * | 7/2006 | Breed | ............ | G07C 5/008 701/31.5 |
| 2002/0003571 A1 * | 1/2002 | Schofield | ............ | B60C 23/00 348/148 |
| 2003/0063004 A1 * | 4/2003 | Anthony | ............ | B60R 25/102 340/574 |
| 2003/0102688 A1 * | 6/2003 | Bingle | ............ | B60Q 3/06 296/76 |
| 2003/0117728 A1 * | 6/2003 | Hutzel | ............ | B60Q 3/023 359/838 |
| 2003/0137426 A1 * | 7/2003 | Anthony | ............ | B60R 25/102 340/574 |
| 2003/0209893 A1 * | 11/2003 | Breed | ............ | B60J 10/00 280/735 |
| 2009/0195655 A1 * | 8/2009 | Pandey | ............ | G08B 13/19647 348/158 |
| 2010/0201505 A1 * | 8/2010 | Honary | ............ | G08G 1/207 340/425.5 |
| 2013/0317693 A1 * | 11/2013 | Jefferies | ............ | G07B 15/00 701/31.5 |

\* cited by examiner

*Primary Examiner* — Behrang Badii
*Assistant Examiner* — Daniel L Greene

(57) ABSTRACT

The present invention relates to a system for automatically adjusting a vehicle feature of a vehicle, where the system includes a first sensor, an onboard computer, a camera, a mirror, a controller; an actuator; and an algorithm. The algorithm instructs the onboard computer in steps for adjusting one or more vehicle features. The first sensor and the controller are in electronic communication with the onboard computer and the controller is in electronic communication with one or more actuators that connect to and adjust the various vehicle features. The onboard computer includes or accesses a database that correlates users, features, and vehicle feature settings. Such vehicle features include seat position and camera viewing angle.

8 Claims, 28 Drawing Sheets

Fig. 6
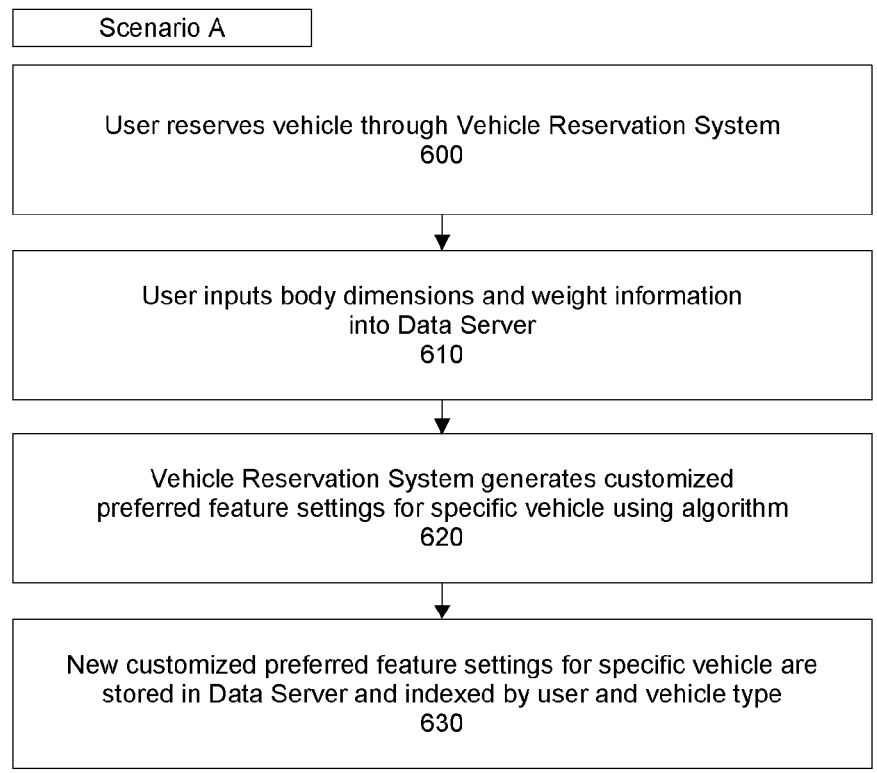
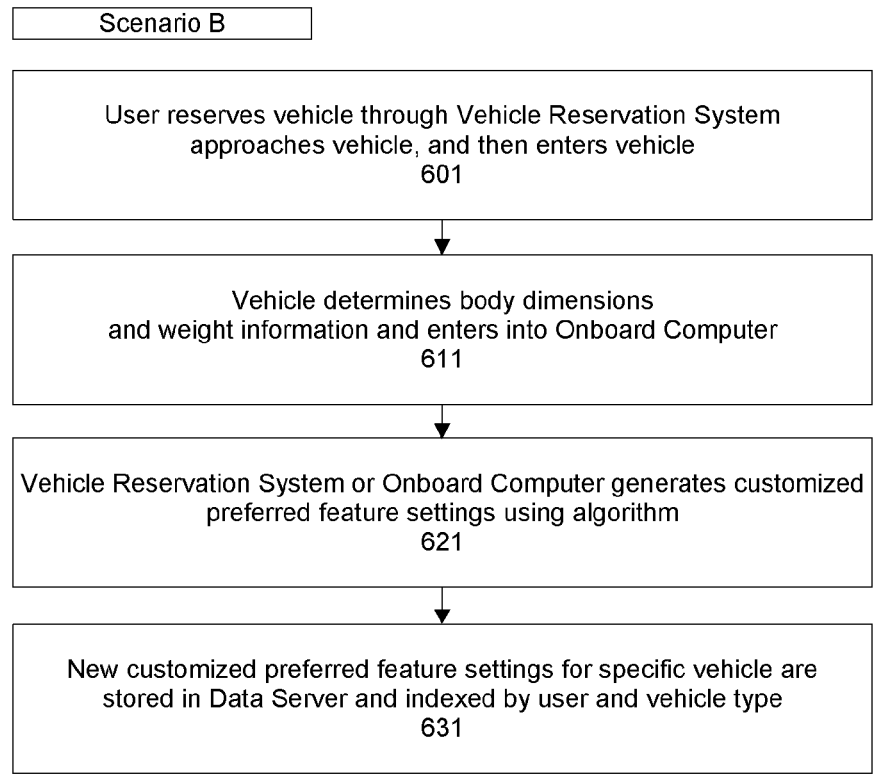

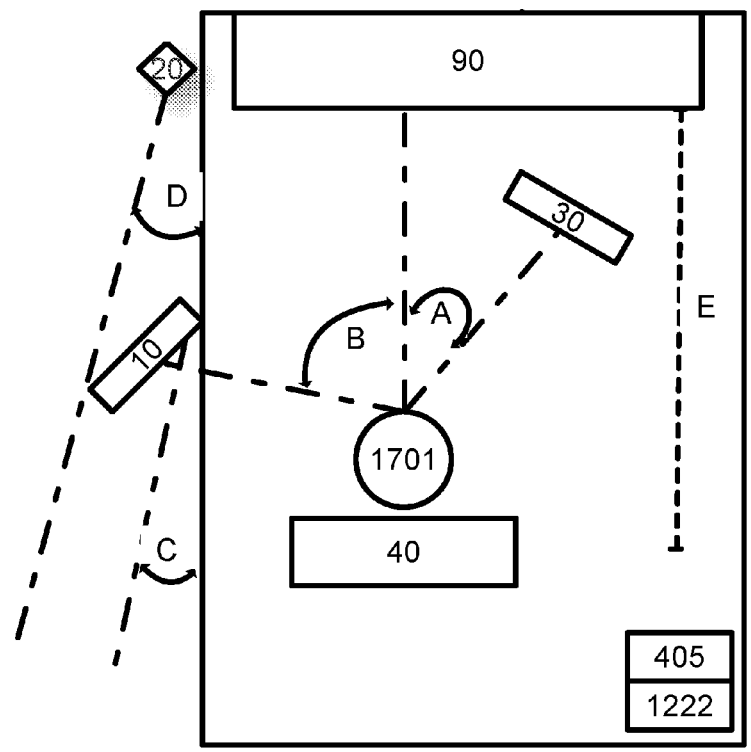
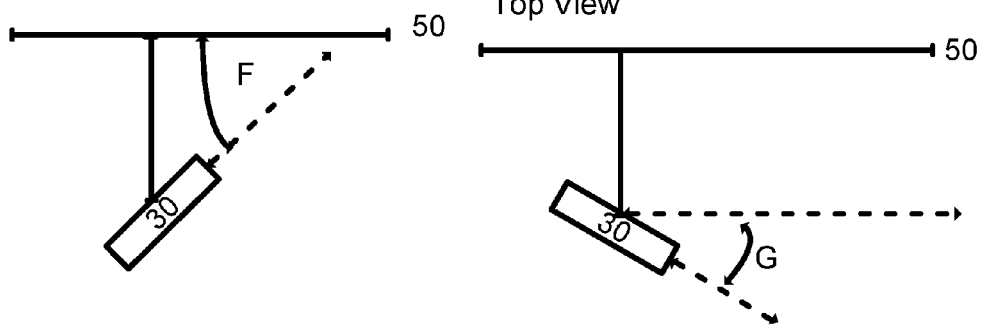

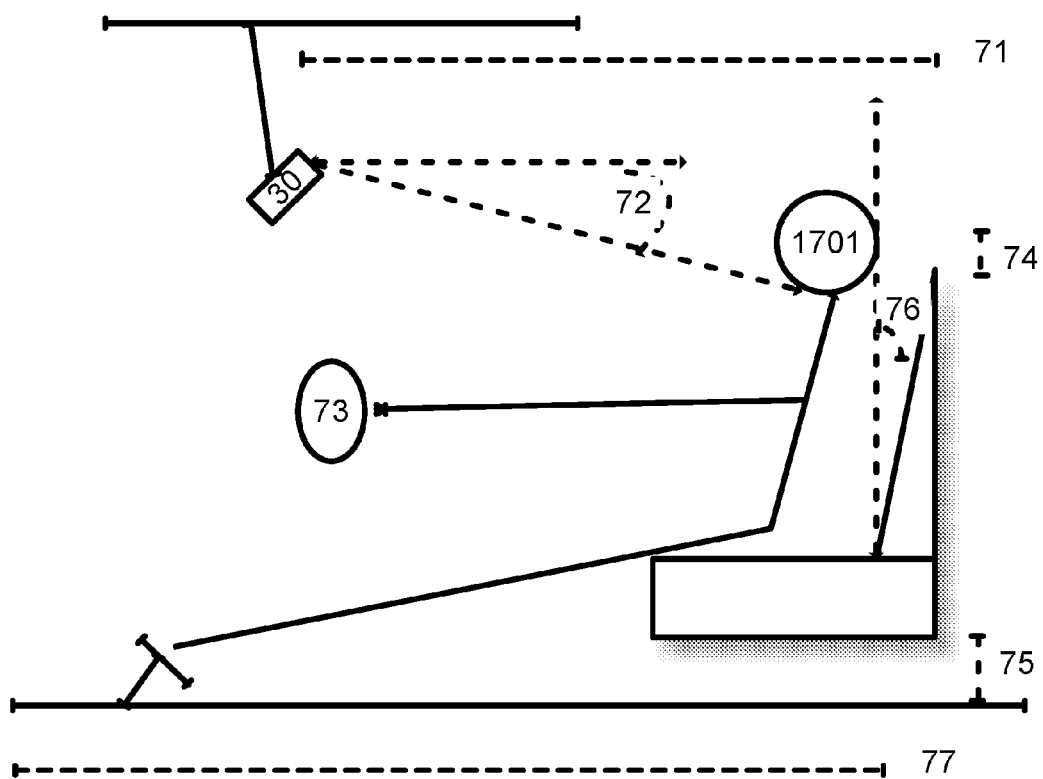

User Entry (Side View) Mode

Automated Movement (Top View) Mode

SYSTEMS FOR A SHARED VEHICLE

FIELD OF INVENTION

The present invention generally relates to the field of information technology and systems management. More particularly, the present invention relates to a shared-use vehicle reservation or rental system that automatically adjusts the features of a vehicle to be used by a user in a manner consistent with the user's preferred vehicle feature settings, assesses interior and exterior condition and content prior to and after a given vehicle user's use of a shared vehicle, and assesses the maintenance and repair requirements of a shared vehicle on a real time basis.

BACKGROUND OF THE INVENTION

In recent years, shared-use vehicle reservation systems have become more commonplace, especially in urban centers. Generally, a shared-use vehicle system consists of a fleet of vehicles shared amongst a group of users wherein no single user exclusively owns a vehicle. A user may reserve a shared-use vehicle online, for example, and later pick up the reserved vehicle from a specified location. Once finished using the vehicle, the user may return the vehicle to the same or another specified location where it is stored until reservation by another user.

There are both environmental and economic advantages associated with shared-use vehicle systems. For example, participating in a shared-use vehicle system may lower an individual user's transportation costs given that vehicle expenses like insurance, maintenance, and car payments are spread across a group of users rather than being absorbed entirely by the individual user. Further, a shared-use vehicle system may reduce a town's need for vehicle parking spaces. Sharing a vehicle increases the vehicle's utilization rate which in turn reduces the number of vehicles required to meet a community's total travel demand and the idle time spent by a vehicle in a parking space. This characteristic of shared-use vehicle systems makes them particularly advantageous for densely populated urban areas where parking spaces are sparse and traffic congestion is great. Still further, shared-use vehicle systems reduce the environmental impact of vehicles on air quality. The higher utilization rate of a shared-use vehicle enables individuals collectively to afford efficient, environmentally-friendly vehicles, such as electric and hybrid-electric vehicles, that otherwise would be cost-prohibitive for an individual.

Although there are numerous social and economic benefits of shared-use vehicle systems, many cities have been slow to adopt them. The concept of spreading risk across a group of people who do not know each other is, of course, commonplace; of course, that concept is the fundamental feature of insurance products. However, the concept of spreading cost across a group of people is commonplace as well, but that is perhaps due to the nature of taxation and the apprehension of public good in such large matters as national security, infrastructure, basic research funding, and the like. When the subject turns to the quality of ownership of most U.S. citizen's most expensive purchase after his or her home, suffice to say many individuals have been reluctant to forgo personal ownership of their personal vehicles.

Vehicles are personal to their respective owners, actually providing a place of refuge in a sense, and are commonly outfitted and stocked in reflection of an owner's specific wants and needs. For these and no doubt other logical reasons as well as many fanciful reasons beyond noting, car owners are commonly resistant to the concept of shared ownership in a fleet of vehicles.

An individual's attachment to his or her personal vehicle may result, at least in part, from customizations that the individual may make to the vehicle. For example, modern vehicles often permit an individual to select a preferred seat position, rear view mirror angle, steering wheel position, foot pedal position, seat heater level, dashboard lighting level, radio station preset, fan speed, air vent direction, vehicle compartment temperature, child-proof lock setting, engine parameter, transmission parameter, etc. Often these vehicle feature settings remain fixed until adjusted by a subsequent user of the vehicle. As a result, when an individual returns to his or her vehicle that is used only by that individual, irrespective of the amount of elapsed time of non-use, the vehicle feature settings will be the same as when the individual left the vehicle. Beyond the fact that the vehicle contains the individual's personal effects, the individual commonly feels "at home" upon re-entering the vehicle.

In addition to contributing to an individual's identification with his or her vehicle, the preferred vehicle feature settings have practical benefits as well. Certain positioning of the driver seat, steering wheel, foot pedals, and rear view mirrors may be necessary for an individual to safely operate the vehicle. An individual could be at risk if, for example, he or she forgets to adjust the rear view mirror angle in order to view rearward traffic. Moreover, if the driver seat is positioned too close to the steering wheel, a driver may have difficulty getting into the vehicle.

A need exists, therefore, for a shared-use vehicle that simulates the experience of personal ownership of the vehicle. Furthermore, a need exists for a shared-use vehicle that automatically adjusts its vehicle features to match the preferred settings of a user who reserves the vehicle.

Offboard and off-board are used interchangeably hereinafter. Onboard and on-board are used interchangeable hereinafter.

SUMMARY OF THE INVENTION

The present invention relates to a shared-use vehicle reservation system that automatically adjusts the features of a vehicle reserved by a user in a manner consistent with the user's preferred vehicle feature settings. The vehicle features that may be adjusted by the system include, for example, the steering wheel position, radio station preset, audio equalizer level, driver seat position, passenger seat position, head rest position, foot pedal position, vehicle compartment temperature, fan speed, driver seat temperature, passenger seat temperature, rear-view mirror angle, dashboard lighting level, ignition lock position, air vent direction, door lock position, child-proof lock setting, transmission parameters, and/or engine parameters. As will be immediately understood by those of the art, the system, materials, and methods of the present invention are fully applicable to a shared-use reservation system as well as a car rental enterprise having repeat customers. Accordingly, the term "shared-use vehicle" is considered no differently than a car that is part of a car rental fleet.

In one embodiment of the present invention, a shared-use vehicle has a sensor that reads an identifying characteristic or code held by an individual in close proximity to the vehicle. The shared-use vehicle may have a wireless communication device for transmitting information regarding the identity of the user to a server. The server may match the identity-directed information of the user with the user's preferred vehicle feature settings and wirelessly transmit this information to the wireless communication device. The shared-use vehicle may have an electronic control unit for adjusting the vehicle features in accordance with the user's preferred settings.

In another embodiment of the present invention, a shared-use vehicle has one or more sensors for determining the settings of vehicle features and an onboard (onboard and on-board are used interchangeably) computer for processing information from the sensors regarding a user's preferred vehicle feature settings. The shared-use vehicle of this embodiment optionally has a wireless communication device for transmitting the user's preferred vehicle feature settings to a server for storage therein.

In another embodiment of the present invention, a shared-use vehicle has a sensor for determining one or more biometric characteristics of a user, an algorithm for determining vehicle feature settings based on the biometric characteristics of the user, and a controller for adjusting vehicle features in accordance with the vehicle feature settings.

In another embodiment of the present invention, a shared-use vehicle has a wireless communication device for receiving information from a server regarding a user's preferred vehicle feature settings and a controller for adjusting vehicle features in accordance with the user's preferred settings.

In another embodiment of the present invention, a shared-use vehicle has an in-vehicle data receiver that may communicate with a portable storage device containing a user's preferred vehicle feature settings. The user may download his or her preferred vehicle feature settings to the portable storage device from a remote server. The shared-use vehicle in this embodiment has a controller for adjusting the vehicle features in accordance with the user's preferred settings.

It is, therefore, an advantage of the present invention to provide a shared-use vehicle that simulates the experience of personal ownership of the vehicle.

Another advantage of the present invention is to provide a shared-used vehicle reservation system that automatically adjusts a reserved vehicle's features in accordance with a user's preferred settings via wireless communication with the reserved vehicle's onboard computer.

A further advantage of the present invention is to provide a shared-use vehicle reservation system that permits a user to download his or her preferred vehicle feature settings to a portable storage device for updating a reserved vehicle's feature settings.

A further advantage of the present invention is to provide a shared-use vehicle which wirelessly communicates a user's preferred vehicle feature setting with a server and/or external database for storage therein.

A further advantage of the present invention is to provide a shared-use vehicle that identifies a user in close proximity to the vehicle and automatically adjusts the vehicle features in accordance with the user's preferred settings.

A further advantage of the present invention is to provide a shared-use vehicle reservation system which converts a user's preferred vehicle feature settings for a first vehicle into vehicle feature settings for a second vehicle.

A further advantage of the present invention is to provide a vehicle having a sensor that determines a user's biometric characteristics, an algorithm for determining optimal vehicle feature settings based on the user's biometric characteristics, and a controller for adjusting the vehicle features in accordance with the optimal settings.

This summary is provided merely to introduce certain concepts and not to identify any key or essential features of the claimed subject matter.

BRIEF DESCRIPTION OF THE DRAWINGS

FIG. 6 is a flowchart showing an algorithm for determining a user's preferred vehicle feature settings based on the biometry of the user.

FIG. 17 is a top view of a vehicle from the interior depicting the visual range of sight from driver through mirrors and cameras.

FIG. 18 is a cross-sectional view of a vehicle from the interior depicting the visual range of sight from driver through mirrors.

FIG. 19 is a top view of a vehicle from the interior depicting the visual range of sight from driver through mirrors.

FIG. 20 is a cross-sectional view from the interior depicting the visual range of sight from driver through mirrors and seat positioning parameters.

FIG. 21 is a table having a series of database records depicting the multiple parameters for angles and distances between driver and sear, driver and mirror, and driver and steering wheel.

DETAILED DESCRIPTION OF THE PREFERRED EMBODIMENTS

With Regard To Feature Adjustment: In general, the present invention is directed toward a system for adjusting vehicle features in accordance with a user's preferences. More specifically, the present invention relates to a vehicle reservation system that automatically updates a reserved vehicle's customizable features with a user's preferred vehicle feature settings. A vehicle's customizable features include, but are not limited to, one or more of the following: the steering wheel position, radio station presets, audio equalizer level, driver seat position, passenger seat position, head rest position, foot pedal position, vehicle compartment temperature, fan speed, driver seat temperature, passenger seat temperature, rear-view mirror angle, dashboard lighting level, ignition lock position, air vent direction, door lock position, child-proof lock setting transmission parameters, and engine parameters.

Figure 1:
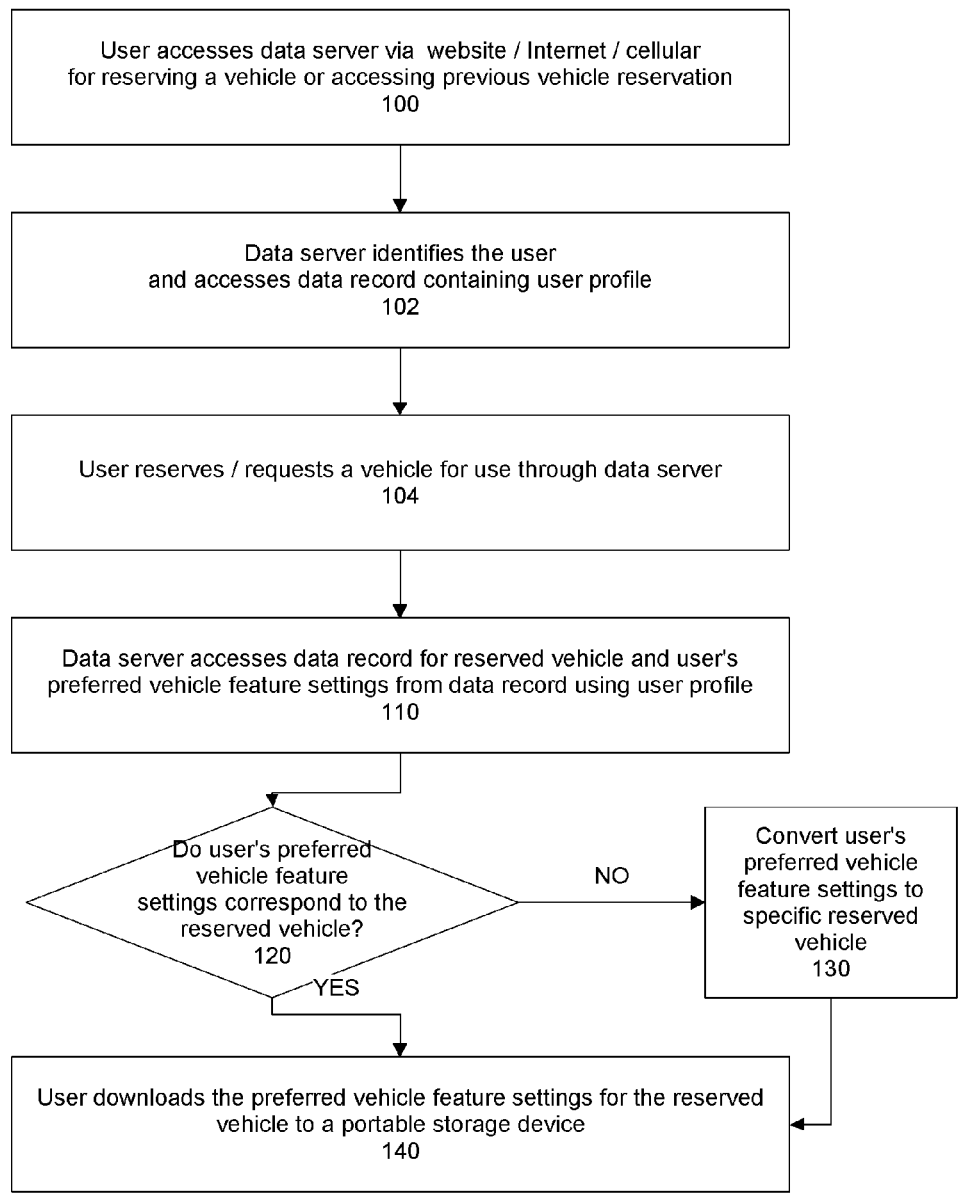
FIG. 1 is a flowchart showing an online vehicle reservation system in which a user downloads preferred vehicle settings for a reserved vehicle to a portable storage device.

FIG. 1 is a flowchart diagramming the process of downloading a user's preferred vehicle settings to a portable storage device. The process begins with the user accessing a website for reserving a vehicle from a fleet of shared transportation vehicles as shown in step 100. Accessing the website is synonymous with accessing a data server (a.k.a. server) by wired and wireless methods including WiFi, cellular 3G, cellular 4G, Bluetooth, WiMax, etc. It is recognized that the process of reserving a vehicle may be prior to the utilization of the reserved vehicle with subsequent access to reservation record through data server. It is also recognized that the process of reserving a vehicle and driving the vehicle may be immediately sequential in time. Next, a server identifies and/or authenticates the user in addition to obtaining user profile as shown in step 102. For example, the user may input a login identifier and/or password unique to the user which the server may use to identify and/or authenticate the user. The user may then reserve a vehicle listed on the website for a particular date, time, pick-up location, and/or drop-off location as shown in step 104. The particularities related to the online vehicle reservation processes described in steps 100, 102, and 104 are generally well known and hereby incorporated by reference.

Upon reservation of a vehicle, the server obtains information from a database and/or server regarding the reserved vehicle and/or the user's preferred vehicle feature settings as shown in step 110. The user's preferred vehicle feature settings may correspond to a type of vehicle different from the user's reserved vehicle, as such the user's database record is further indexed by vehicle type. For example, the user may reserve a type-A vehicle but the user's preferred vehicle settings stored in the database and/or server may relate to a type-B vehicle. Either the vehicle onboard computer "VOC", the data server, or the user communication device (e.g., smart phone, cellular phone, or YoGo parking system) determines if the user profile already contains a record linked for vehicle feature settings corresponding to the reserved vehicle type 120. If the vehicle feature settings for the current user are already available, the user downloads as shown in step 140 the preferred vehicle feature settings for the reserved vehicle to a portable storage device (e.g., cellular phone, cellular smart phone, USB drive, etc. as known in the art). If not known yet for the reserved vehicle type, the VOC, data server, or smart phone convert's the user's preferred vehicle feature settings for known vehicle types by utilizing an algorithm, including neural networks to calculate the user's preferred feature settings for this reserved vehicle type as shown in step 130, in such a scenario a program may transform the user's preferred vehicle feature settings for the type-B vehicle into vehicle features settings for the type-A vehicle. The vehicle feature settings for the type-A vehicle may substantially replicate the conditions associated with the user's preferred vehicle feature setting for the type-B vehicle. To accomplish this result, the program may, for example, use the dimensions of the vehicle compartment, steering wheel, seats, and/or pedals of the type-B vehicle to determine the spatial relationships between the user and the vehicle features of the type-B vehicle. The program may then determine vehicle feature settings for the type-A vehicle that replicate the spatial relationships of the type-B vehicle by comparing the dimensions of the type-A vehicle with those of the type-B vehicle.

After the server has obtained the user's preferred vehicle feature settings for the reserved vehicle, the user may download the preferred vehicle feature settings to a portable storage device as shown in step 140. The portable storage device may be any device that may store electronic information and may be carried on one's person such as a flash drive, laptop, cellular phone, personal digital assistant, and/or personal media player. The manner in which the user's preferred vehicle feature settings are downloaded and stored in the portable storage device is intended to be entirely conventional.

Figure 2:
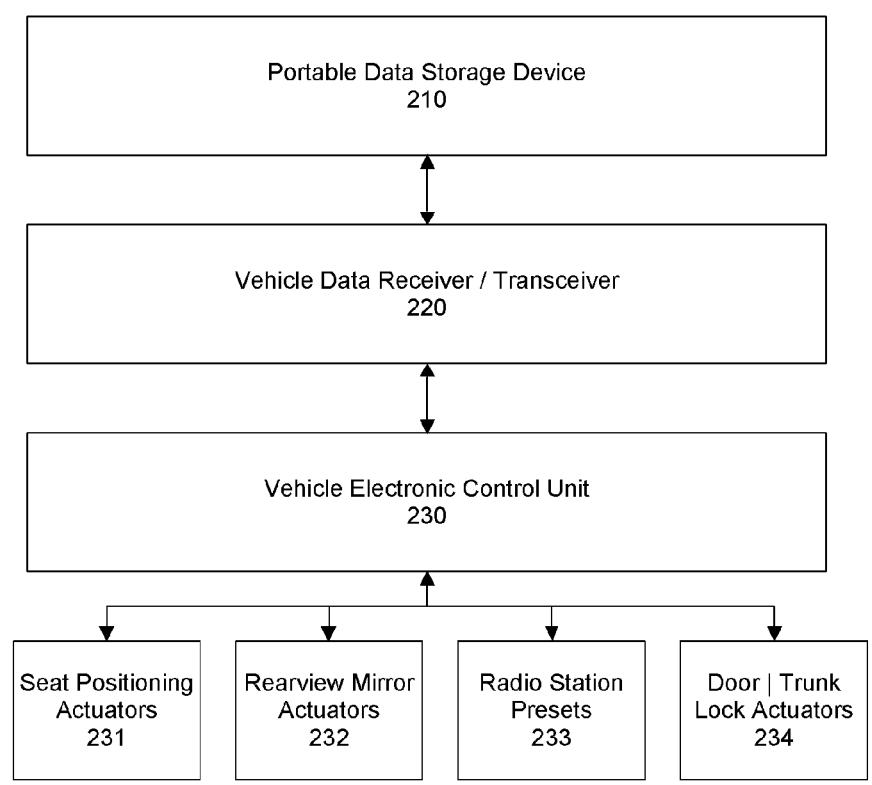
FIG. 2 is a block diagram of a vehicle feature control system that communicates a user's preferred vehicle feature settings with a portable storage device.

FIG. 2 is a block diagram for a vehicle feature control system. The system may include a data receiver 220, electronic control unit 230, and actuators 240 for each vehicle feature. The portable storage device 210 may transfer information relating to the user's reservation and preferred vehicle feature settings to the data receiver 220 wirelessly and/or through a hard-wired connection. The data receiver, which is interchangeably referred to as a data transceiver, 220 may verify the identity of the user and the reservation information by wirelessly communicating with the reservation website. The data receiver 220 may interface and communicate with the electronic control unit 230. The electronic control unit 230 may transform the information relating to the user's preferred vehicle feature settings into electronic signals which control and/or power the actuators 240 for adjusting the vehicle features. The actuators include seat positioning actuators 231, rearview mirror actuators 232, radio station presets 233, and door/trunk lock actuators 234.

Figure 3:
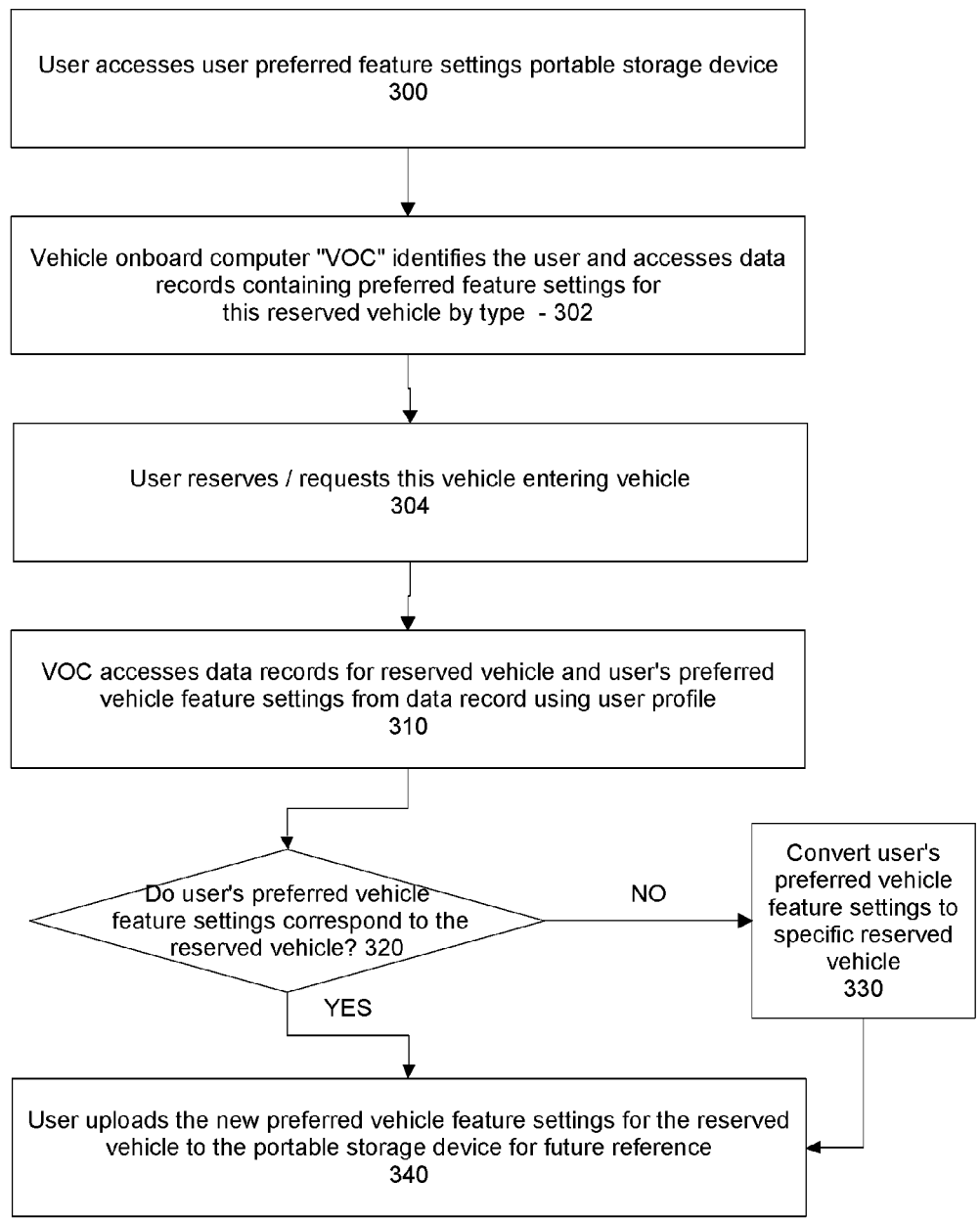
FIG. 3 is a flowchart showing an online vehicle reservation system that wirelessly communicates a user's preferred vehicle settings directly with a reserved vehicle.

In another embodiment of the present invention, the user's preferred vehicle settings may be transmitted from an external database and/or server to an in-vehicle onboard computer. FIG. 3 is a flowchart diagramming the process of wirelessly transmitting a user's preferred vehicle settings to a remote vehicle via the user's portable data device. The process begins with the user accessing a vehicle within the fleet of shared vehicles for reserving a vehicle from a fleet of shared transportation vehicles as shown in step 300. Step 300 includes the direct communication between the portable data storage device and the VOC. Next, a server identifies and/or authenticates the user as shown in step 302. For example, the user may input a login identifier and/or password unique to the user which the VOC may use to identify and/or authenticate the user. The user may then reserve a vehicle by way of VOC confirmation through direct communication, or indicator of availability including vehicle being parked in a queue of available vehicles (i.e. pick-up location) as shown in step 304. The particularities related to the online vehicle reservation processes described in steps 300, 302, and 304 are generally well known and hereby incorporated by reference.

Upon entry into the reserved vehicle, the VOC obtains information from the portable data storage device or through communication as known in the art to obtain user preferred vehicle settings for either the exact vehicle type or a range of previously stored preferred feature settings for other vehicles previously used vehicle types by the user as indexed/stored in a database and/or server as shown in step 310. The user's preferred vehicle feature settings may correspond to a type of vehicle different from the user's reserved vehicle. In such a scenario, a program may transform the user's preferred vehicle feature settings to create similar conditions in the reserved vehicle, as discussed above. After the server has obtained the user's preferred vehicle feature settings for the reserved vehicle, it may wirelessly transmit data describing the preferred vehicle feature settings to the VOC, as shown in step 340. The manner in which the wireless transmission is executed is generally well known to those skilled in the art. Either the vehicle onboard computer "VOC", the data server, or the user communication device (e.g., smart phone, cellular phone, or YoGo parking system) determines if the user profile already contains a record linked for vehicle feature settings corresponding to the reserved vehicle type 320. If the vehicle feature settings for the current user are already available, the user downloads as shown in step 340 the preferred vehicle feature settings for the reserved vehicle to a portable storage device (e.g., cellular phone, cellular smart phone, USB drive, etc. as known in the art). If not known yet for the reserved vehicle type, the VOC, data server, or smart phone convert's the user's preferred vehicle feature settings for known vehicle types by utilizing an algorithm, including neural networks to calculate the user's preferred feature settings for this reserved vehicle type as shown in step 330, in such a scenario a program may transform the user's preferred vehicle feature settings for the type-B vehicle into vehicle features settings for the type-A vehicle. The vehicle feature settings for the type-A vehicle may substantially replicate the conditions associated with the user's preferred vehicle feature setting for the type-B vehicle.

Figure 4:
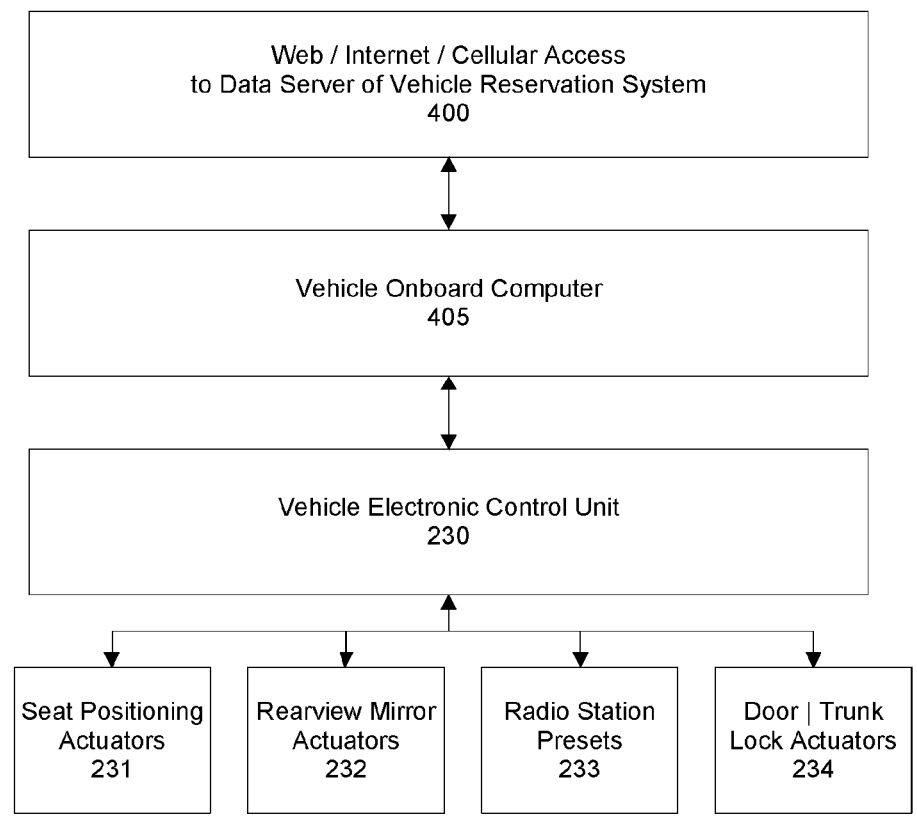
FIG. 4 is a block diagram of a vehicle feature control system that wirelessly communicates a user's preferred vehicle feature settings with an online vehicle reservation system database and/or remote server.

FIG. 4 is a block diagram for a vehicle feature control system having the ability to receive wireless communications 400. The system may include an onboard computer VOC 405, electronic control unit 230, and actuators as referenced earlier including seat positioning actuators 231, rearview mirror actuators 232, radio station presets 233, and door/trunk lock actuators 234. Additional actuators as known in the art for adjusting each vehicle feature are included as reference. The onboard computer 405 may interface with an electronic control unit 230 and communicate the user's preferred vehicle settings with the electronic control unit 230. The electronic control unit 230 may control and/or power the actuators 231, 232, 233, and/or 234 for adjusting the vehicle features. Alternatively, the onboard computer 405 may communicate directly with and control the actuators 231, 232, 233, and/or 234 for adjusting the vehicle features (not shown in FIG. 4).

The onboard computer 405 may instantaneously transmit a signal to adjust the vehicle features upon receiving a transmission from the server. Alternatively, the onboard computer 405 may transmit a signal to adjust the vehicle features only after determining that the vehicle is not in use. Alternatively, the onboard computer 405 may be connected to a sensor which may identify the user when the user is in close proximity to the reserved vehicle. In such an embodiment, the onboard computer 405 may store information concerning the identity of the user. This information may be transmitted wirelessly to the onboard computer 405 from the server. The onboard computer 400 may adjust the vehicle features once it has authenticated the identity of the user by comparing information from the sensor with user identity information from the server.

Figure 5:
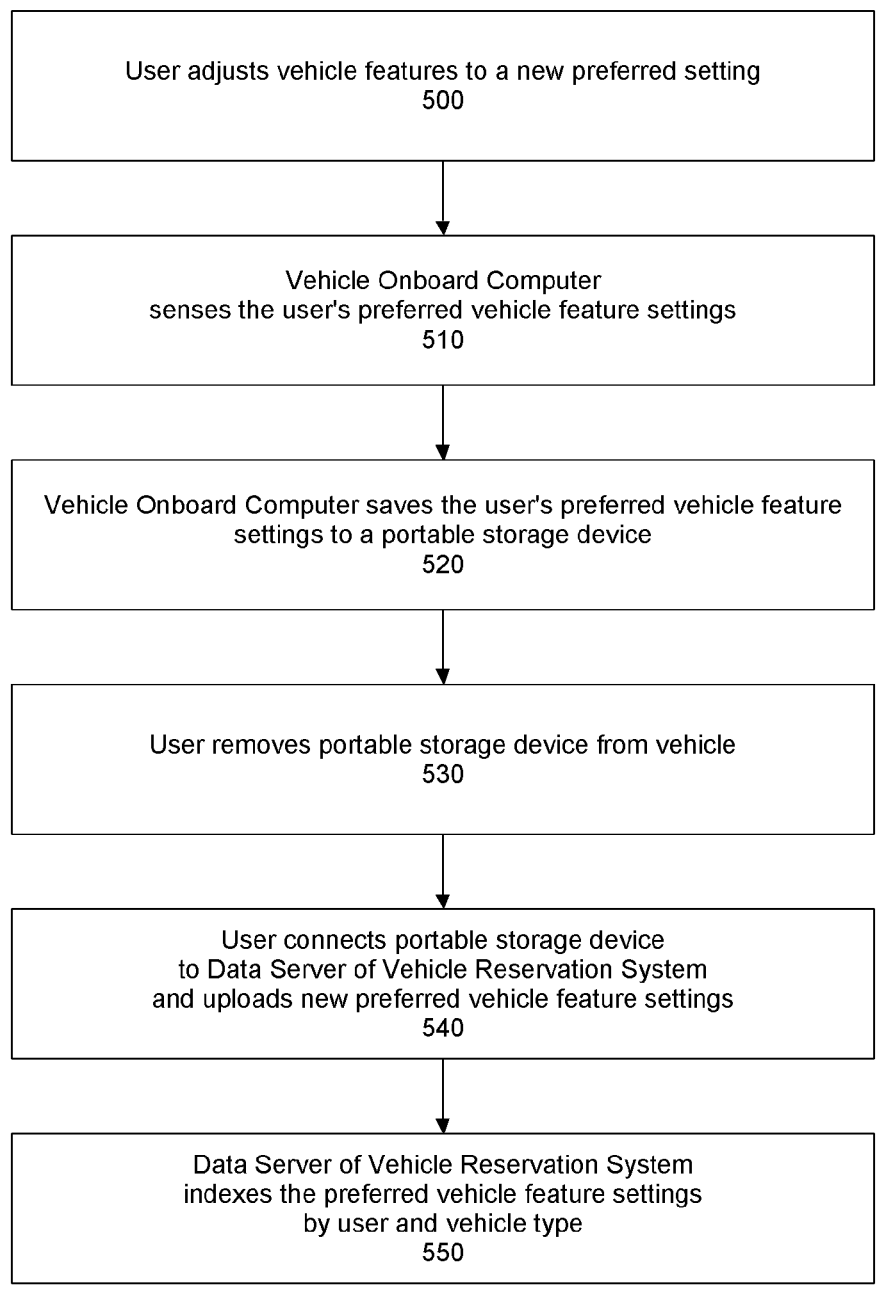
FIG. 5 is a flowchart showing a process in which a user's preferred vehicle settings may be saved on a server and/or external database.

FIG. 5 is a flowchart diagramming the process in which a user's preferred vehicle settings may be saved on a server and/or database external to the vehicle. The process begins with the user adjusting the vehicle features to a preferred setting when using the vehicle as shown in step 500. Next, an onboard computer may collect data regarding the user's preferred vehicle settings by communicating with sensors that monitor the position and/or state of the vehicle features as shown in step 510. The onboard computer may then save the user's preferred vehicle settings to a portable storage device such as a flash drive, laptop, cellular phone, personal digital assistant, and/or personal media device in step 520. After using the vehicle, the user may remove the portable storage device 530 from the vehicle and connect it to a personal computer and/or other device with the ability to access the Internet. In step 540, the user may upload the user's preferred vehicle feature settings saved on the portable storage device to a server and/or database containing information related to a vehicle reservation system. The server and/or database may index the user's preferred vehicle settings by the identity of the user and type of vehicle as shown in step 550. In another embodiment of the present invention, the onboard computer may have wireless communication abilities. After a user has adjusted the vehicle features to a preferred setting, the onboard computer may wirelessly transmit data describing these settings to a server and/or database containing information related to a vehicle reservation system.

FIG. 6, Scenario A is a flowchart diagramming the process by which an algorithm may automatically determine a user's preferred vehicle feature settings. The process begins with the user accessing the Vehicle Reservation System, as known in the art through a website, Internet connection, or other wired or wireless methods as known in the art for reserving vehicles as shown in step 600. The user may select a vehicle for reservation after accessing the website. Next, the website may request and the user may input biometric information describing the user's body dimensions and weight as shown in step 610. Body dimensional information may include, for example, the length of the user's legs, arms, and/or abdomen. The user may also enter information concerning the user's preferred radio station presets, dashboard lighting levels, and other preferred electronic media settings. Next, an algorithm from the Vehicle Reservation System may compare the user's biometric information with dimensions of the reserved vehicle to calculate vehicle features settings customized for the user unique to that vehicle type of the reserved vehicle 620. For example, the algorithm may determine a seat height and/or foot pedal position that may permit a user with a certain leg length to reach the foot pedals. Finally, the customized vehicle feature settings may be stored in a database for later transmittal to a vehicle reserved by the user as shown in step 630.

FIG. 6, Scenario B is a flowchart diagramming the process by which an algorithm may automatically determine a user's preferred vehicle feature settings. The process begins with the user accessing the Vehicle, as shown in step 601 where the user approaches the vehicle. Next, the vehicle may request the user preferred vehicle feature settings, which may be communicated by way of portable data storage device. Alternatively, the VOC obtains biometric information describing the user's body dimensions and weight as shown in step 611. Body dimensional information may include, for example, the length of the user's legs, arms, and/or abdomen. The user may also enter information concerning the user's preferred radio station presets, dashboard lighting levels, and other preferred electronic media settings. Next, an algorithm from the Vehicle Reservation System may compare the user's biometric information with dimensions of the reserved vehicle to calculate vehicle features settings customized for the user unique to that vehicle type of the reserved vehicle 621. For example, the algorithm may determine a seat height and/or foot pedal position that may permit a user with a certain leg length to reach the foot pedals. Finally, the customized vehicle feature settings may be stored in a database for later transmittal to a vehicle reserved by the user as shown in step 631.

Figure 7:
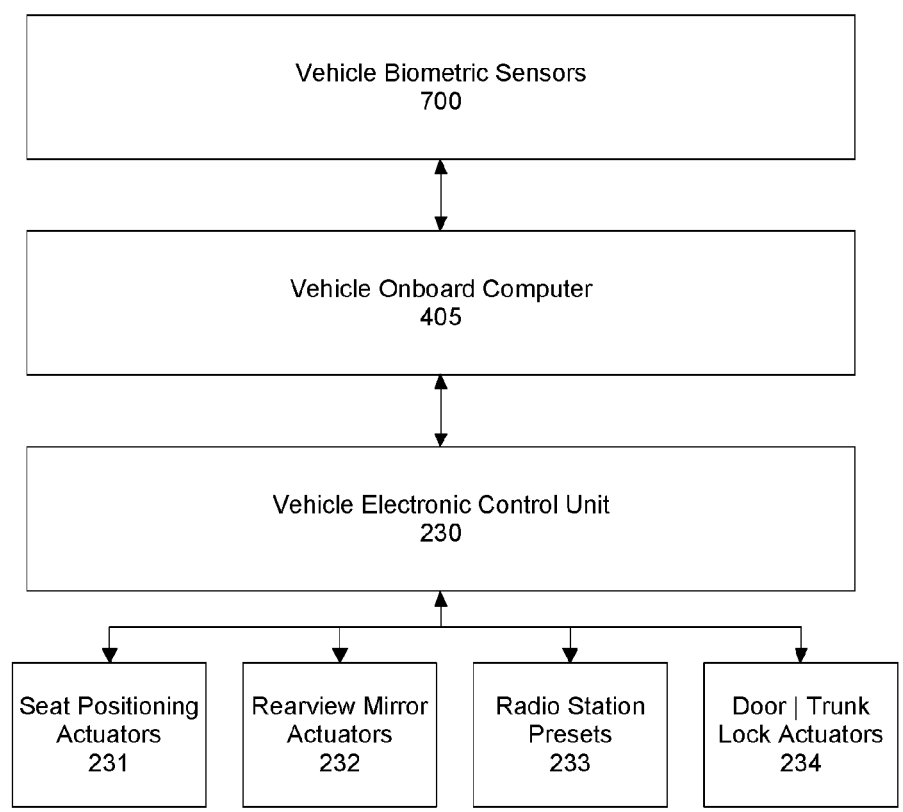
FIG. 7 is a block diagram of a vehicle feature control system that uses a biometric sensor.

FIG. 7 is a block diagram for one embodiment of the vehicle feature control system that adjusts vehicle feature settings based on a user's biometric characteristics. The system includes a biometric sensor 700, an onboard computer 405, an electronic control unit 230, and actuators 231, as referenced earlier including seat positioning actuators 231, rearview mirror actuators 232, radio station presets 233, and door/trunk lock actuators 234. Additional actuators as known in the art for adjusting each vehicle feature are included as reference. The sensor 700 may be any sensor having the ability to determine a user's biometric characteristics, such as body dimensions, weight, limb length or lengths if multiple limbs are measured, torso length, or combinations thereof. For example, the sensor 700 can determine the length of a user's legs, arms, and/or torso. The sensor 700 in this embodiment transmits information regarding the user's biometric characteristics to an onboard computer 405. The onboard computer 405 uses an algorithm to compare the user's biometric characteristics with vehicle dimensions in order to calculate optimal vehicle feature settings for the user. For example, the algorithm may determine a seat height and/or foot pedal position that permits a user with a certain leg length to reach the foot pedals. The onboard computer 405 may interface and communicate with an electronic control unit 230. The electronic control unit 230 can transform the information regarding the user's preferred vehicle feature settings into electronic signals which may control and/or power the actuators 231, 232, 233, and/or 234 for adjusting the vehicle features.

Figure 8:
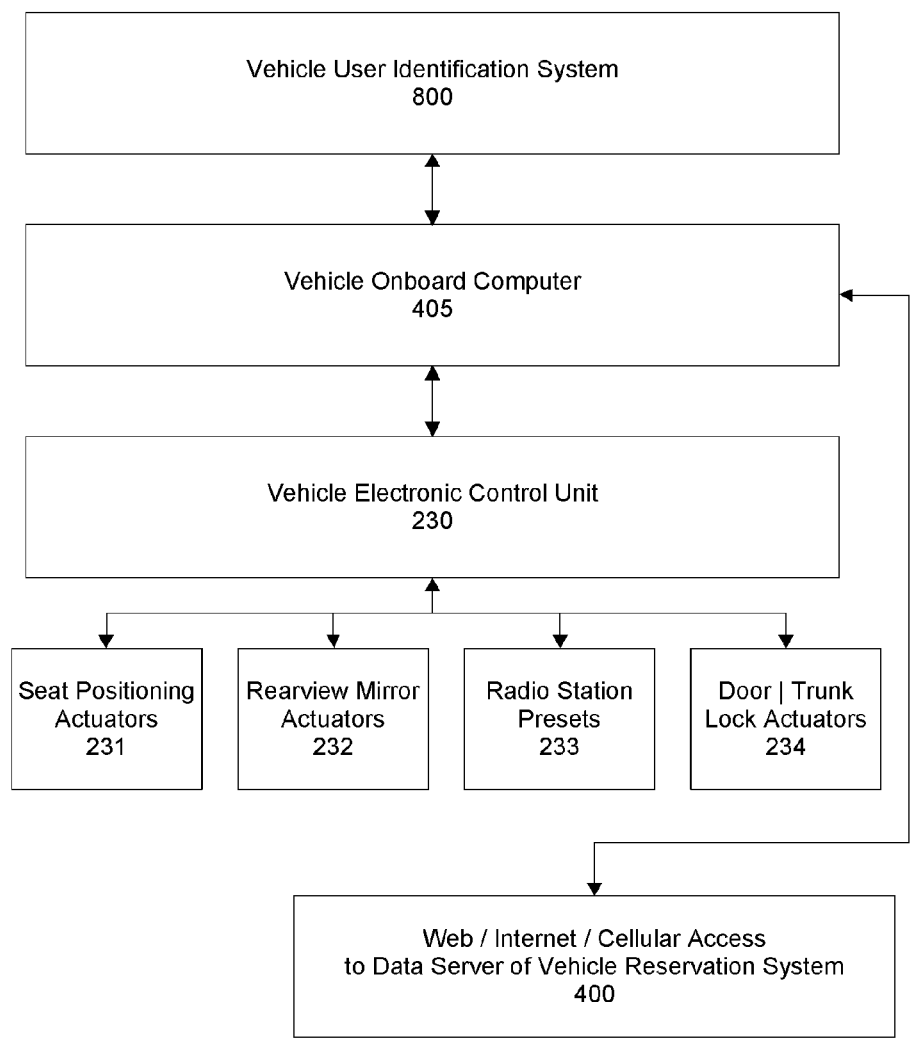
FIG. 8 is a block diagram of a vehicle feature control system that uses an identification sensor.

FIG. 8 is a block diagram for one embodiment of the vehicle feature control system. In this embodiment, the system adjusts vehicle feature settings based on the identity of a user. Accordingly, the system includes an identification sensor 800, an onboard computer 405, a remote server 400, an electronic control unit 230, and actuators 231, 232, 233, and/or 234 for adjusting each vehicle feature as aforementioned. The identification sensor 800 may be a voice-recognition sensor, bar code reader, and/or finger print reader, to name a few methods usefully employed for personal identity recognition. In an alternative embodiment, the identification sensor 800 is a radio frequency identifier that receives a signal indicating the identity of the user from a radio frequency transmitter carried by the user. In that case, the identification sensor 800 transmits information regarding the user's identity to the onboard computer 405. The onboard computer 405 can transmit to the remote server 400 the identity of the user. The remote server 400 may contain information regarding the user's preferred vehicle feature settings, in which case this embodiment of the present invention would include a wireless communication from the remote server to the onboard computer 405 to provide these settings to the onboard computer 405. in turn, the onboard computer 405 communicates the user's preferred vehicle feature settings by way of the electronic control unit 230. The electronic control unit 230 may transform the information regarding the user's preferred vehicle feature settings into electronic signals that control and/or power the actuators 231, 232, 233, and/or 234 for adjusting the vehicle features.

With Regard To Camera-Mediated Inspection: In general, the present invention is directed toward a system for assessing interior and exterior conditions of a vehicle. More specifically, the present invention relates to a shared-use vehicle with the ability to determine if a user has left a personal item within the vehicle and/or if the user has left the vehicle in a soiled or damaged condition.

Figure 9:
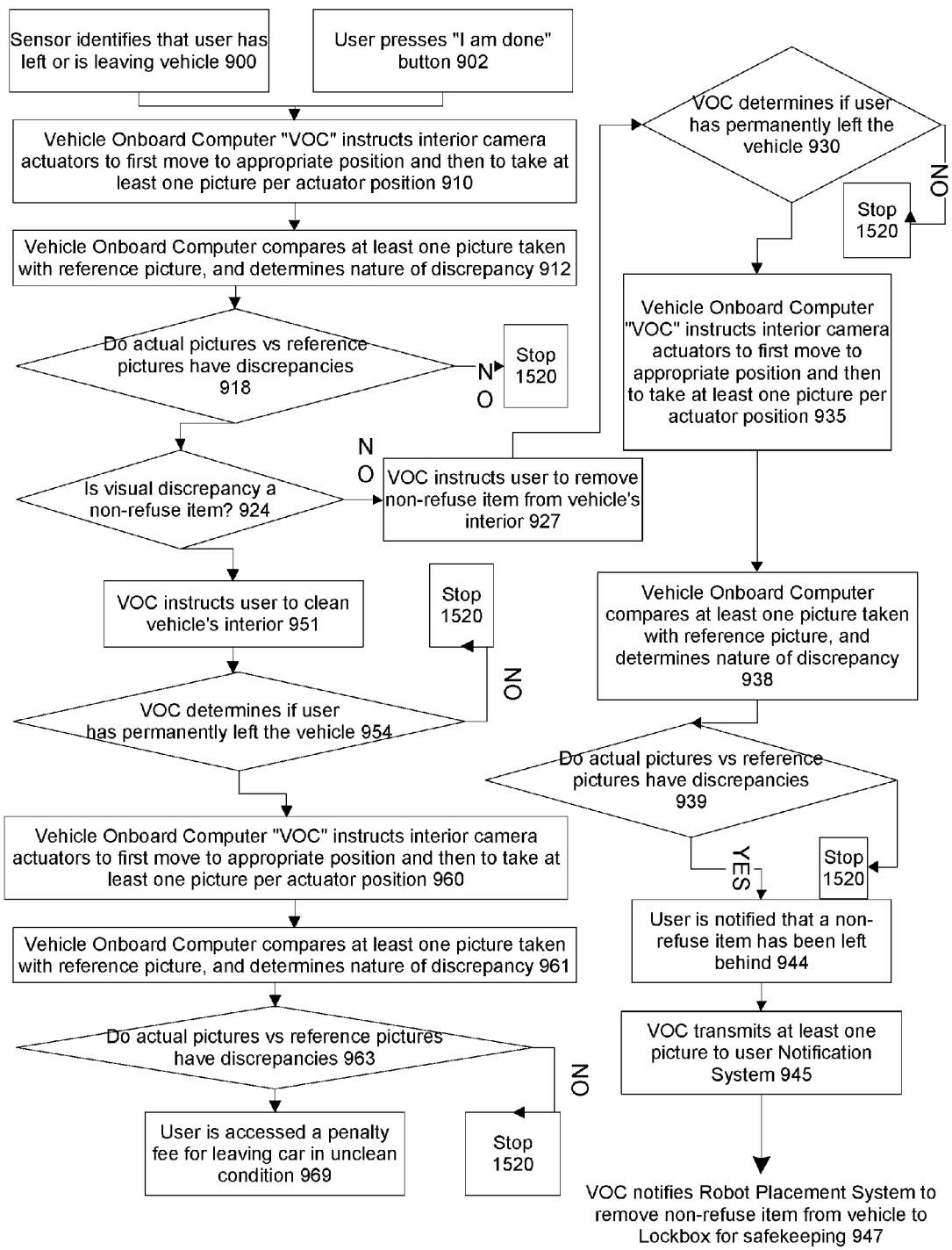
FIG. 9 is a flow chart of the process of assessing the interior condition of a shared-use vehicle in two parts.

FIG. 9 is a flowchart diagramming the process of assessing the interior condition of a vehicle and communicating the same to a prior user of the vehicle depicted on two separate pages with linkage occurring at point A. The process may begin with an in-vehicle sensor(s) identifying that a user has left and/or is about to leave the vehicle as shown in step 900. For example, a driver seat weight sensor may determine that the driver seat is vacant. Alternatively, a user may press a button that signals the computer that the user is permanently leaving the vehicle as shown in step 902.

Next, the onboard computer may instruct a camera to capture a first picture of the vehicle's interior as shown in step 910. The camera may be, for example, a digital camera coupled to the roof of the vehicle compartment. The camera may be centrally located on the roof in order to view a substantial portion of the vehicle's interior. The camera may communicate with the onboard computer through a wired and/or wireless connection. The camera may be coupled to an actuator for rotating the camera. This may permit the camera to take pictures of the vehicle interior over a 360 degree range.

Next, the onboard computer may compare the first picture of the vehicle's interior with a reference picture of the vehicle's interior as shown in step 912. The reference picture may be a picture of the vehicle's interior taken when no foreign objects were present within the vehicle and/or the vehicle interior was clean. Alternatively, the reference picture may be a picture of the vehicle's interior taken immediately before a user commenced operation of the vehicle. The onboard computer may use an algorithm to determine if any discrepancies exist between the first picture and the reference picture as shown in step 918. If discrepancies are present, the algorithm may determine if the discrepancies relate to a personal item, refuse item, and/or discoloration of the vehicle interior resulting from dirt and/or scum as shown in step 924.

If the personal and/or non-refuse item is present within the vehicle, the onboard computer may instruct the user to remove the non-refuse item before permanently leaving the vehicle as shown in step 927. If no discrepancies are present the process stops as shown in step 1520. The vehicle may have a liquid crystal display screen, light emitting diode (LED) indicator, and/or audio device for alerting the user of the presence of the personal and/or non-refuse item within the vehicle. Next, the onboard computer may determine if the user has permanently left the vehicle as shown in step 930. In the context of a shared-use vehicle, the onboard computer may determine that a user has permanently left the vehicle by ascertaining whether the user's reservation for the vehicle has expired. If the user has permanently left the vehicle, the camera may capture a second picture of the vehicle interior as shown in step 935. The onboard computer may then use the algorithm to determine if any discrepancies exist between the second picture and the reference picture as shown in step 938. If discrepancies are present, the onboard computer may wirelessly transmit a message to the user via email, for example, notifying the user of the presence of the personal and/or non-refuse item within the vehicle as shown in step 944. The onboard computer may also wirelessly transmit the second picture to the user and/or a server for storage therein. Next, an automated device may move the personal and/or non-refuse item to a lockbox for storage until the user returns to claim the item as shown in step 947. The automated device may be a robotic arm that may extend from a storage compartment located in the roof, for example. The robotic arm may have a length that allows it to reach any portion of the vehicle. The robotic arm may have a gripping mechanism for holding the personal and/or non-refuse item when moving it to the lockbox. The lockbox may be located in the vehicle's trunk and may be accessible through a downward folding rear seat, for example. Alternatively, the lockbox may be located beneath a vehicle seat. The onboard computer may lock the lockbox after the personal and/or non-refuse item has been placed in the lockbox by the robotic arm. The onboard computer may unlock the lockbox once the user returns to repossess to the personal and/or non-refuse item.

If the algorithm determines that the discrepancies between the second picture and the reference picture do not relate to a personal and/or non-refuse item, the onboard computer may instruct the user to clean the vehicle's interior as shown in step 951. The vehicle may have a liquid crystal display screen, light emitting diode (LED) indicator, and/or audio device for notifying the user that cleaning is required. Next, the onboard computer may determine if the user has permanently left the vehicle as shown in step 954. If user has not permanently left vehicle, the the process stops as shown in step 1520. In the context of a shared-use vehicle, the onboard computer may determine that a user has permanently left the vehicle by ascertaining whether the user's reservation for the vehicle has expired. If the user has permanently left the vehicle, the camera may capture a second picture of the vehicle interior as shown in step 960. The onboard computer may then use the algorithm to determine if any discrepancies exist between the second picture and the reference picture as shown in step 963. If discrepancies are present, the onboard computer may wirelessly transmit the second picture to the user via email, for example, and/or to a server for storage therein. In the context of a shared-use vehicle, the user may be assessed a penalty fee for leaving the vehicle in an unclean condition as shown in step 969. If no discrepancies are present the process stops as shown in step 1520.

Figure 10:
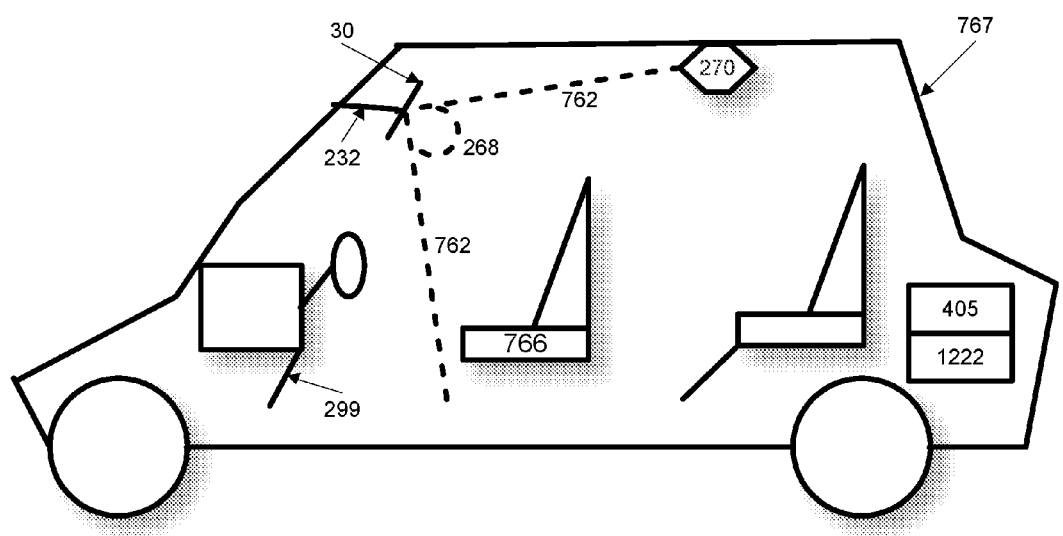
FIG. 10 is a cross-sectional view of a vehicle having a camera that is able to include in its field of view objects located beneath a vehicle seat.

FIG. 10 is a cross-sectional view of a vehicle 767 having a camera 270 with the ability to view objects beneath a vehicle seat 766. The camera 270 may have a line of sight 762 that is redirected by a rear-view mirror 30 attached to a vehicle's windshield by rear view mirror actuator 232. The rear-view mirror 30 may be the same mirror conventionally used by a driver to view objects behind a vehicle. A viewing angle 268 may be formed by the portion of the line of sight 762 extending between the camera and the rear-view mirror 30 and the portion of the line of sight 762 extending between the mirror 30 and a viewing location. An actuator 232 that adjusts the position and/or tilt of the rear-view mirror 30 may be coupled with the mirror 30. The actuator 232 may be housed within a support structure that attaches the rear-view mirror 30 to the windshield. By adjusting the position and/or tilt of the mirror 268, the actuator 232 may alter the viewing angle 268 and/or the viewing location. FIG. 10 shows a configuration of the rear-view mirror and the camera 270 that results in a viewing location of the area beneath the driver seat. Other viewing locations may include, but are not limited to, the area beneath a passenger's seat, a driver's anterior, passenger's anterior, and/or any viewing location obstructed from the camera's direct line of sight. In another embodiment of the present invention, the mirror 30 may be a side mirror (not shown) coupled with an exterior side panel of the vehicle 767. An actuator (not shown) may be coupled with the side mirror for adjusting the position and/or tilt of the side mirror. The side mirror may provide the camera 270 with a view of the vehicle's side panels, wheels, and/or hubcaps. In another embodiment, an actuator (not shown) for adjusting the position of the camera 270 may be coupled with the camera 270.

In addition, an optimal fixed mirror 299 can be placed at the midpoint of the front floor area such that the roof-mounted camera 270 can be actuated to direct its line of sight 762 at the optimal fixed mirror 30, thereby giving the camera 270 a view that includes the underside of the front portion of the front seat. In one embodiment, the optimal fixed mirror 299 may have a convex shape, thereby permitting the camera 270 to view the full range of the front seat's underside. In another embodiment, the optimal fixed mirror 299 encompasses two angles, one for directing the camera's line of sight 762 to the left side of the front seat's underside and one for directing the camera's line of sight 762 to the right side of the front seat's underside. Similarly, a second optimal mirror 764 can be placed at the floor near the vehicle's rear seat such that the camera 270 can be actuated to direct its line of sight 762 at the second optimal mirror 764, thereby giving the camera 270 a view that includes the back portion of the underside of the of the front seat. Additionally, a light may be provided near the underside of the front seat for illuminating the underside of the front seat.

Figure 11:
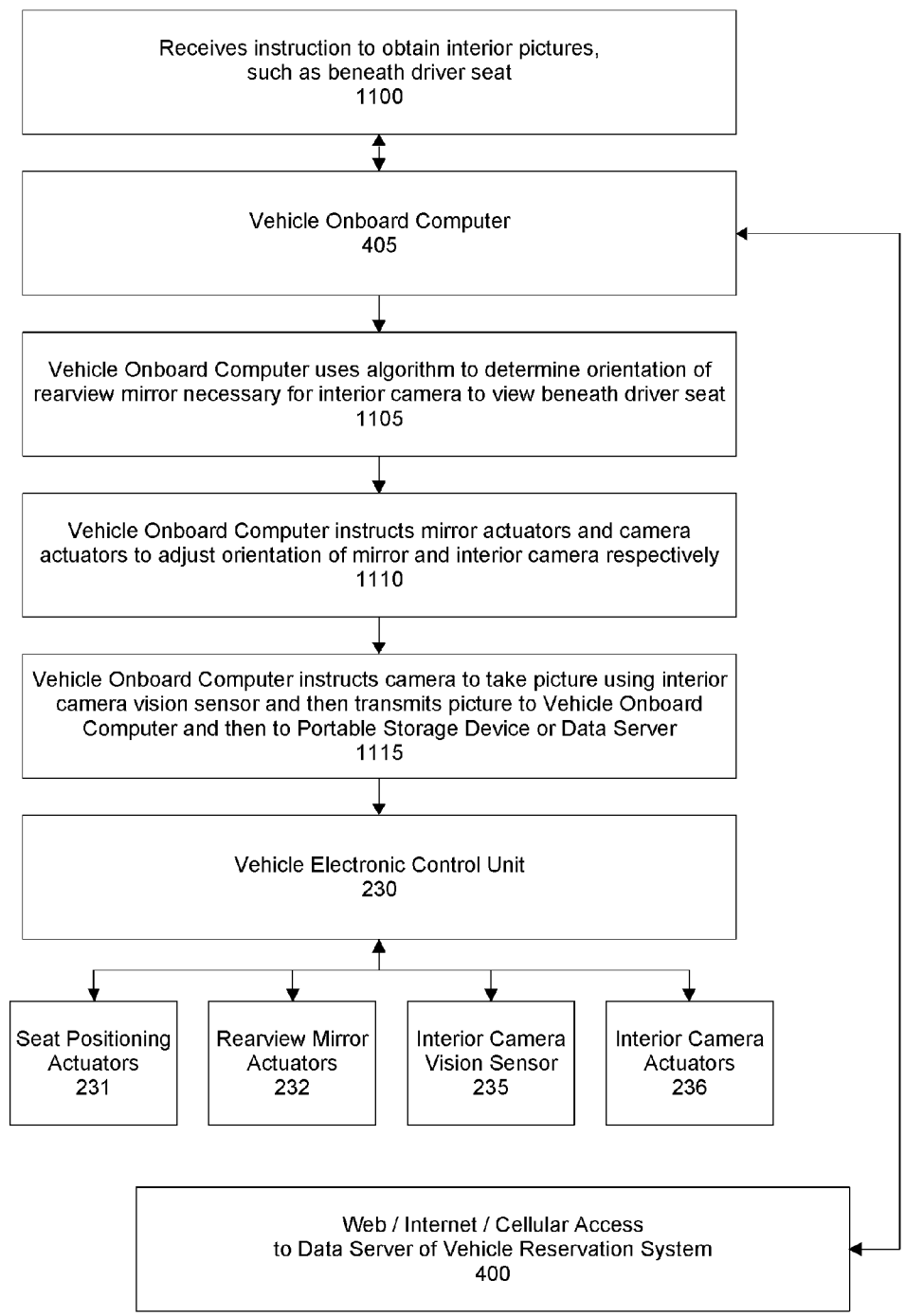
FIG. 11 is a flowchart diagramming a process by which an in-vehicle camera may obtain a picture of a portion of the vehicle that is obstructed from the camera's direct "line of sight."

FIG. 11 is a flowchart diagramming the process in which an in-vehicle camera 270 may obtain a picture of a portion of the vehicle obstructed from the camera's direct line of sight. The process may begin with an onboard computer 405 receiving an instruction to obtain a picture of a portion of the vehicle such as the area beneath the driver seat as shown in step 1100. The computer may receive the instruction from an external server through which a prior user of the vehicle has requested a picture of the vehicle's interior. For example, in the context of a shared-use vehicle, a user who has left behind a personal item in the shared-use vehicle may submit a request on a website for the vehicle to transmit a picture of the area beneath the driver seat to the user's email.

Next, an algorithm may determine a viewing angle 762 that may allow the camera 270 to capture a picture of the area beneath the driver seat as shown in step 1105. The computer 405 may then instruct the mirror actuator 232 to adjust the mirror 30 in a manner to create the viewing angle 762 as determined by the algorithm as shown in step 1110. Next, the camera may capture a picture of the area beneath the driver seat and/or of any other portion of the vehicle and transmit the picture(s) to the computer as shown in step 1115. The computer may then wirelessly transmit the picture(s) to a server for storage therein and/or transmit the picture(s) to a prior user of the vehicle via email as shown in step 1115. The actuators, which include the aforementioned 231, 232, 233, and/or 234 are controlled using the vehicle electronic control unit 230.

Figure 12:
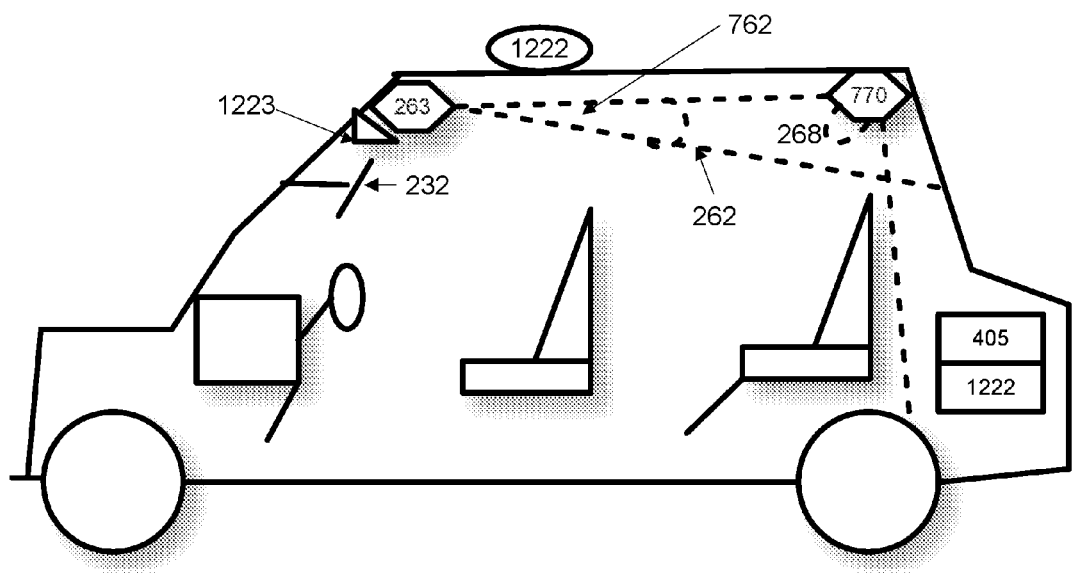
FIG. 12 is a cross-sectional view of a vehicle having a multi-purpose camera and a mirror/camera actuated control system.

FIG. 12 is a block diagram of a mirror-camera control system. The system may include a front mounted camera 263, a mirror actuator 232, computer 405, wireless communication device 1222, server 405, and/or a camera actuator 1223. The computer 405 may be connected to and/or control the mirror actuator 232 and/or the camera actuator 1223. The front mounted camera 263 may transmit its pictures to the computer 405 via a wired or wireless connection 1222 with the computer 405. This connection may also serve as means by which the computer 405 controls the operation of the camera 263. The computer 405 may interface with a wireless communication device that wirelessly transmits information from the computer 405, such as pictures from the camera 263 with viewing angle between 762 and 262, to a server as reflected off of the rear mounted mirror 770 having viewing angle 268.

The vehicle 767 having a multi-purpose camera 263 with the ability to view objects within and surrounding the vehicle 767. The camera 263 may be attached to a forward portion of the vehicle compartment such as the windshield. The camera 263 may have a line of sight 762 directed toward the vehicle's rear that includes both a redirectional mirror 770 and objects exterior to the vehicle 767. Exterior objects may be visible to the camera 263 through the vehicle's rear and side windows as visible by line of sight angle 262. The redirectional mirror 770 may be coupled with a rear portion of the vehicle's interior roof. The redirectional mirror 770 may redirect the camera's line of sight 262 to a viewing location otherwise obstructed from the camera's field of view. The camera, camera actuators, and/or redirectional mirror actuators may be automatically controlled by the vehicle's onboard computer 405. The vehicle's onboard computer may monitor vehicle operational parameters which are measured by sensors commonly found on modern vehicles. The onboard computer may adjust the position, tilt, and/or zoom of the camera and/or redirectional mirror in response to a measured vehicle operational parameter. For example, upon sensing that the vehicle's turn signal has been activated and that the vehicle is moving, the computer may adjust the position of the camera and/or redirectional mirror such that the camera's viewing location includes the vehicle's blind spot. In another example, the computer may instruct the camera to record the objects surrounding the vehicle at various exterior locations upon and/or substantially near the time the computer senses a collision involving the vehicle.

It should be noted that the camera-mirror arrangement in FIG. 12 is fully compatible with the system for assessing the interior conditions of a vehicle as shown in FIG. 9 and discussed above. Also, the camera-mirror arrangement in FIG. 12 is fully compatible with the system for obtaining a picture of a portion of the vehicle obstructed from the camera's direct line of sight as shown in FIG. 10 and discussed above.

Figure 13:
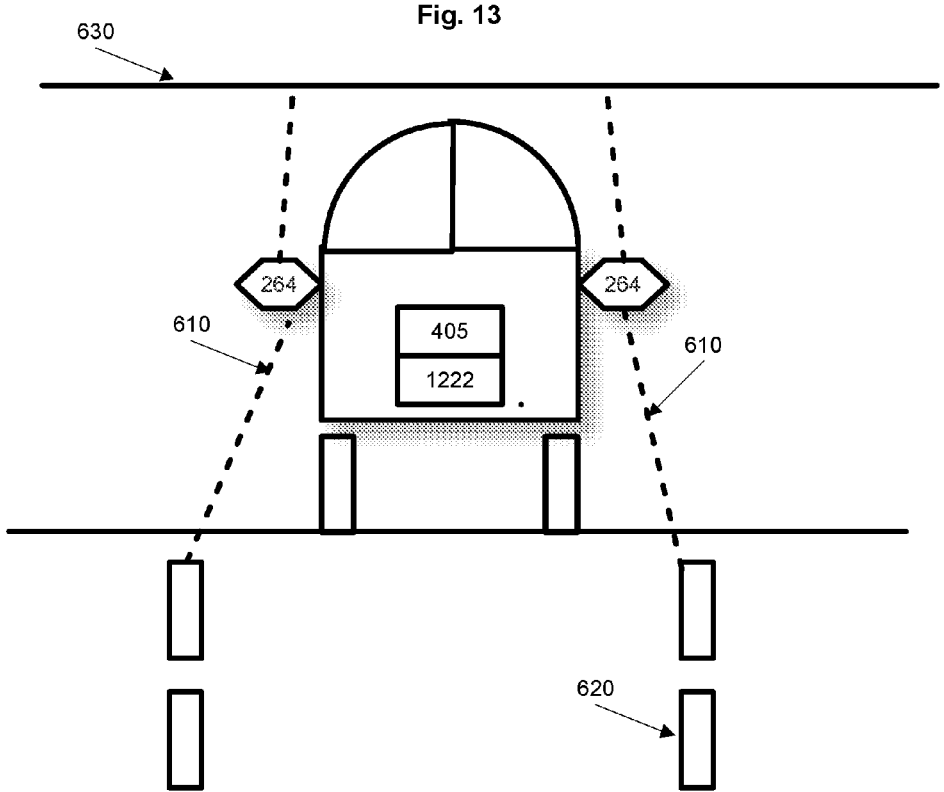
FIG. 13 is a rear view of a vehicle that shows one embodiment of a vehicle having multi-purpose cameras mounted on the vehicle's exterior for viewing rearward traffic, providing images for a vehicle's self-guidance system, and/or assessing the condition of the vehicle's exterior.

FIG. 13 shows a vehicle having multi-purpose cameras 264 mounted on the vehicle's exterior for viewing rearward traffic, providing images for a vehicle's self-guidance system, and/or assessing the condition of the vehicle's exterior. In one embodiment, the cameras 264 may be located on the vehicle's side panels and contained within a housing structure. The housing structure may have a low aerodynamic profile such that drag created by the housing structure is minimized. In another embodiment, the cameras 264 may be coupled to side mirrors typically found on vehicle's driver and passenger-side doors.

Each camera 264 may have lines of sight 610 that includes the exterior of the vehicle and/or objects surrounding the vehicle. The cameras 264 may be offset from the vehicle's side panels such that the cameras 264 may have a line of sight 610 that includes the vehicle's side panels and/or wheels. The camera 264 may have a line of sight 610 substantially similar to the line of sight 610 of a driver using his or her conventional side mirrors. Actuators that adjust the position of the cameras' lines of sight 610 may be attached to the cameras 264. The actuators may rotate the cameras 264 such that the camera 264 may view objects above, below, in front of, behind, and/or adjacent to the vehicle. The actuators may also turn and/or tilt the camera such that the cameras' lines of sight 610 include the exterior of the vehicle. An onboard computer may automatically control the actuators and/or the driver may manually control the actuators by using an in-vehicle input unit. When the vehicle is moving and the vehicle's self-guidance system is not engaged, the computer may automatically position the cameras 264 such that they have rearward lines of sight 610.

The vehicle may have an output unit for displaying real-time and/or recorded images captured by the cameras 264. The output unit may be located on the vehicle's dashboard or any other location within the driver's field of view. The output unit may be a cathode ray tube and/or a liquid crystal display screen. When the cameras 264 are positioned to view objects behind the vehicle, the output unit may serve the same function as a vehicle's conventional side mirrors by providing the driver with a view of rearward traffic.

The cameras 264 mounted on the exterior of the vehicle may be integrated with the system for assessing the condition of a vehicle as shown in FIG. 9 and discussed above. The only difference being that the assessment algorithms may use the images captured by the exterior cameras 264 to determine damage to the exterior of the vehicle (e.g. dents, scraps, missing hubcaps) and/or cleanliness of the vehicle's exterior rather than assessing the condition of the vehicle's interior. The cameras 264 mounted on the exterior of the vehicle may also be integrated with a vehicle's self-guidance system. When a vehicle's self-guidance system is engaged, the cameras 264 may be directed by the actuators at the road surface. The cameras 264 may capture images of lane stripes 620 adjacent to the vehicle which the self-guidance system may use to drive the vehicle within a traffic lane. Alternatively, when a vehicle is within a parking garage, the cameras 624 may be directed by the actuators at the parking garage's roof 630. The cameras 264 may capture images of symmetrical structures attached to and/or part of the parking garage roof 630 which the self-guidance system may use to safely drive the vehicle within the parking garage. Examples of such symmetrical structures include lighting fixtures, support beams, and/or utility conduits.

With Regard to Predictive Maintenance Aspects: In general, the present invention is directed toward a vehicle predictive maintenance system. More specifically, the present invention relates to a system for assessing the wear of vehicle components based upon the acceleration and/or deceleration of the vehicle and/or a route taken by the vehicle.

Figure 14:
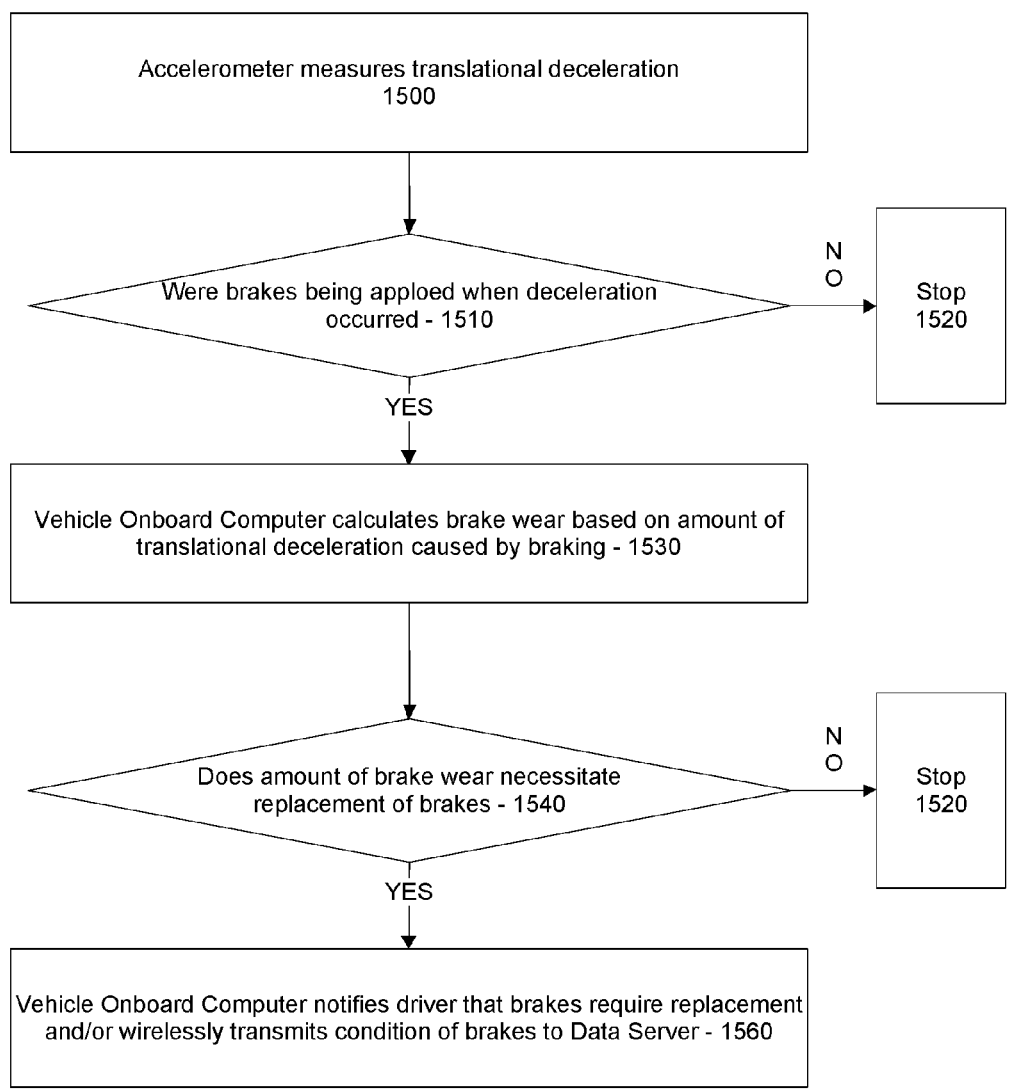
FIG. 14 is a flowchart diagramming the process of using an in-vehicle accelerometer to estimate the wear experienced by a vehicle's brakes.

FIG. 14 is a flowchart diagramming the process of using an in-vehicle accelerometer to estimate the wear experienced by a vehicle's brakes. Brake wear may be defined as a decrease in thickness of a brake pad and/or rotor. The process may begin with an in-vehicle accelerometer measuring the translational deceleration of the vehicle as shown in step 1500. Translational deceleration may be defined as the rate of decrease in the forward and/or rearward velocity of the vehicle. The accelerometer may be connected to a computer which may store the deceleration measurements made by the accelerometer. The computer may be disposed within or without the vehicle. Modern vehicles contain many accelerometers such as those commonly used by vehicles' anti-lock braking systems and air-bag systems. The accelerometer used in the present invention may be one of those commonly used in modern vehicles.

Next, the computer may determine if the driver of the vehicle was applying the brakes at the time of the translational deceleration measured by the accelerometer as shown in step 1510. This step may be necessary given that the accelerometer may measure translational deceleration due to rolling friction and/or drag forces in addition to the translational deceleration resulting from application of the vehicle brakes. Modern vehicles often have sensors for determining if the vehicle's brakes are being applied use such as those commonly used in the vehicles' ABS and brake-by-wire systems. These sensors often communicate the status of the vehicle's brakes to an in-vehicle computer. The present invention may utilize these sensors to determine if the vehicle's brakes were being applied at the time of the translational deceleration measured by the accelerometer.

In step 1510, the computer may also determine if the translational deceleration was the result of regenerative braking which is commonly used in electric and hybrid electric vehicles. Regenerative braking decelerates a vehicle by converting the vehicle's kinetic energy into a storeable form of energy, such as electricity, rather than dissipating the kinetic energy as heat through friction as does a conventional brake pad. Regenerative braking thus does not cause wear to conventional brake pads. The computer may not include translation deceleration due to regenerative braking in its determination of brake wear.

Next, the computer may use an algorithm to estimate the amount of brake wear based on the amount of translational deceleration resulting from application of the vehicle brakes as shown in step 1530. The algorithm may calculate the force applied to the brakes by multiplying the translational deceleration measured by the accelerometer with the vehicle's mass. The algorithm may calculate an impulse experienced by the brakes by taking the integral of the calculated force with respect to time. The algorithm may use the calculated force, impulse, and/or material properties of the brakes (e.g. hardness, compressive strength, toughness, and/or coefficient of friction) to estimate the amount of brake wear.

The algorithm may then determine if a decrease in a brake's thickness due to brake wear necessitates replacement of the brakes as shown in step 1540. If replacement of the brakes is required, the computer may notify the user of a vehicle as shown in step 1560. In the context of a shared-use vehicle, the computer may wirelessly transmit information regarding brake wear to an external server.

Figure 15:
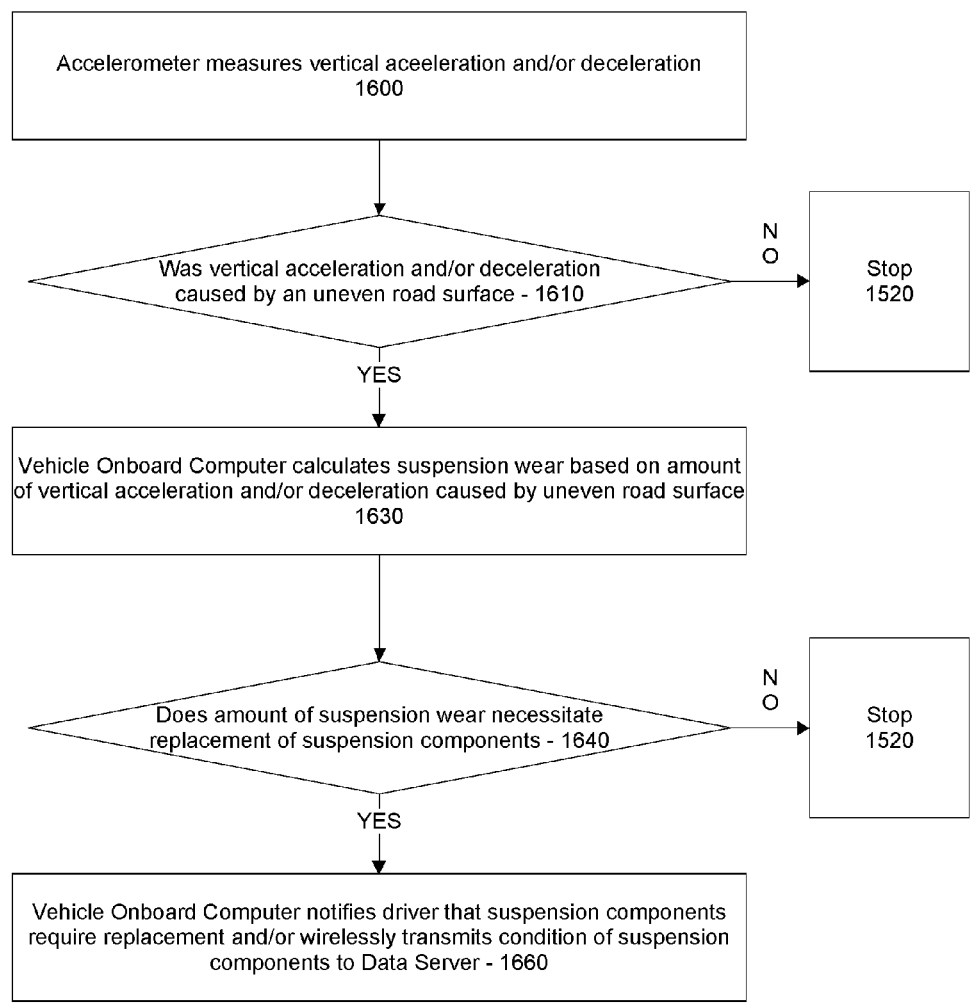
FIG. 15 is a flowchart diagramming the process of using an in-vehicle accelerometer to estimate the wear experienced by a vehicle's suspension.

FIG. 15 is a flowchart diagramming the process of using an in-vehicle accelerometer to estimate the wear experienced by a vehicle's suspension. The process may begin with an in-vehicle accelerometer measuring vertical deceleration and/or acceleration of the vehicle as shown in step 1600. Vertical deceleration and acceleration may be defined, respectively, as the rate of decrease or increase in the velocity of the vehicle in a direction orthogonal to the road surface. The accelerometer may be connected to a computer which may store the deceleration and/or acceleration measurements made by the accelerometer. Modern vehicles contain many accelerometers such as those commonly used by vehicles' anti-lock braking systems. The accelerometer used in the present invention may be one of those commonly used in modern vehicles.

Next, the computer may determine if the vehicle was traversing uneven terrain at the time of the vertical deceleration and/or acceleration measured by the accelerometer as shown in step 1610. This step may be necessary given that the accelerometer may measure translational deceleration or acceleration due to the vehicle's navigation of a downward or upward sloping road. The computer may use an algorithm to calculate the impulse (as discussed below) experienced by the vehicle's suspension resulting from vertical deceleration and/or acceleration. The computer may determine that the vertical deceleration and/or acceleration is due to uneven terrain such as a pothole, rather than a downward or upward sloping road, by identifying instances of spikes in the calculated impulse.

Next, the computer may use an algorithm to estimate the amount of suspension wear based on the amount of vertical deceleration and/or acceleration resulting from uneven terrain as shown in step 1630. The algorithm may calculate the force applied to the suspension by multiplying the translational deceleration and/or acceleration measured by the accelerometer with the vehicle's mass. The algorithm may, in turn, use this calculated force to determine the impulse experienced by the brakes by multiplying the force with the time period during which the force was applied. The algorithm may use the calculated force, impulse, and/or material properties of the suspension (e.g., elastic modulus and/or toughness) to estimate the amount of suspension wear.

The algorithm may then determine if the amount of vehicle wear necessitates replacement of the suspension as shown in step 1640. If replacement of the suspension is required, the computer may notify the user of a vehicle as shown in step 1660. In the context of a shared-use vehicle, the computer may wirelessly transmit information regarding suspension wear to an external server.

Figure 16:
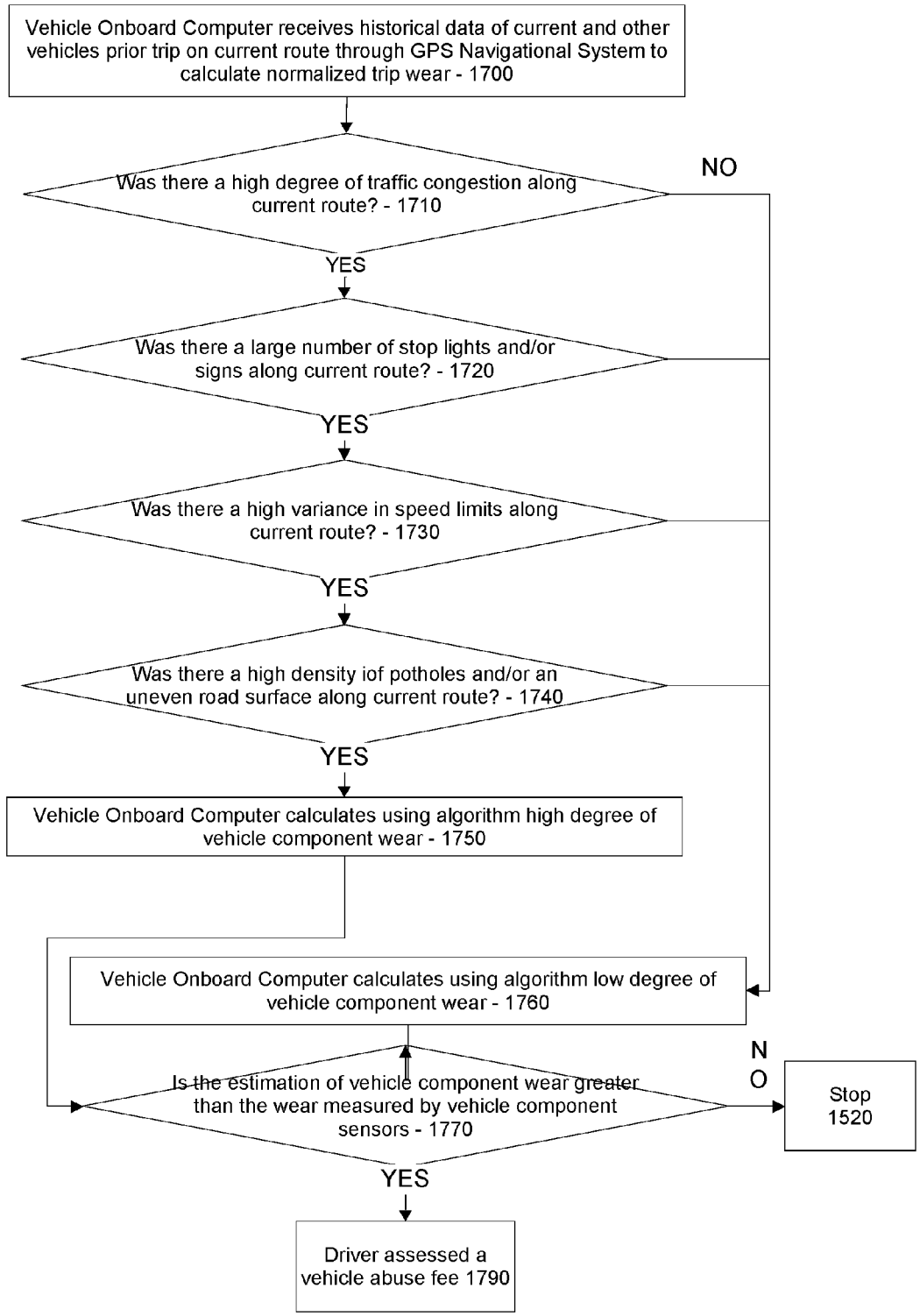
FIG. 16 is a flowchart diagramming the process of using a vehicle's prior locations of travel to estimate the wear experienced by a vehicle's components.

FIG. 16 is a flowchart diagramming the process of using a vehicle's prior locations of travel to estimate the wear experienced by a vehicle's components. The process may begin with a computer processing and/or storing information describing a vehicle's geographic location from a global positioning sensor as shown in step 1700. The computer may store the geographic locations and their associated time stamps for a route traveled by a vehicle. It should be noted that the computer may be disposed within or without the vehicle.

Next, the computer may determine road and/or traffic conditions of the vehicle's prior geographic locations. For example, the computer may use traffic reports to determine the traffic congestion of a prior route traversed by the vehicle as shown in step 1710. The computer may use maps to determine the number of traffic lights and/or stop signs through which the vehicle traveled along a prior route as shown in steps 1720. The computer may also use maps to determine if a high variance in speed limits existed along the vehicle's prior route thereby requiring the driver to frequently increase and/or decrease the vehicle's speed as shown in step 1730. The computer may also use maps of potholes, such as those provided by Google Maps, to determine if a high number of potholes existed along a vehicle's prior route as shown in step 1740. The computer may also use maps to determine the composition of the road surface along a vehicle's prior route as shown in step 1740. The road and/or traffic conditions along a vehicle's prior route used to determine vehicle wear are not limited to those described in steps 1710-1740 and may include any road and/or traffic condition affecting the use and/or wear of the vehicle. Furthermore, weather conditions existing along a vehicle's prior route and/or the distance travel by a vehicle along a prior route may be used to determine vehicle wear.

Next, the computer may use an algorithm to estimate the amount of damage and/or wear sustained by the vehicle based on the road and/or traffic conditions along the vehicle's prior route as shown in steps 1750 and 1760. For example, the algorithm may estimate an amount of suspension wear based on the number of potholes and/or the composition of the road surface along a vehicle's prior route. The algorithm may estimate a high degree of brake wear if the vehicle has traveled through a substantial number of traffic lights, stop signs, and/or heavily congested roads along its prior route. The algorithm may also calculate a high degree of transmission wear based on these conditions given that the frequent changes in speed required by stop-and-go traffic which results in numerous transmission gear changes. Based on the degree of vehicle wear estimated by the algorithm, the computer may determine vehicle maintenance actions such as replacement of brake pads, engine oil, transmission fluid, tires, and/or suspensions components, for example.

In the context of a shared-use vehicle, the computer may compare the estimation of vehicle wear determined in steps 1750 and 1760 with actual vehicle wear measured by in-vehicle sensors as shown in step 1770. Actual vehicle wear may be determined directly by brake pad thickness sensors, for example, or indirectly by the processes discussed in regards to FIGS. 14 to 16. If the actual vehicle wear is greater than the estimation of vehicle wear based on the vehicle's prior route, the user of the vehicle may be assessed an "abuse" fee.

FIG. 17 is a top interior view of the shared vehicle. A user that is a driver 1701 sitting in front seat 40 has the position of rearview mirror 30 and sideview mirror 10 positioned to the user's preferred vehicle settings. The VOC 405 in conjunction with mirror actuator position feedback and/or interior user facing camera calculate the preferred vehicle settings into parameters that are subsequently stored within the user profile for the specific vehicle type. These parameters are depicted in FIG. 17-FIG. 21. As shown in FIG. 17, angle A is the viewing angle between the passenger head 1701 and the rearview mirror 30; angle B is the viewing angle between the passenger head 1701 and the sideview mirror 10; angle D is the viewing angle between the side of the shared vehicle and the outward angle required to view the blindspot when using a side mounted camera 20; angle C is the viewing angle between the side of the shared vehicle and the outward angle required to view the blindspot when using the side mirror 10; and length E is the distance from the dashboard 90 to the front seat 40.

FIG. 18 is a side view of the interior depicting the rearview mirror 30 and the angle F between the ceiling 50 of the shared vehicle.

FIG. 19 is a top view of the interior depicting the rearview mirror 30 and the angle G between the rearview mirror 30 and the horizon 50.

FIG. 20 is a side view from the user (driver) door side depicting the numerous parameters for accurate positioning of the seat, seat angle 76, mirror 30 angle 72, steering wheel 73, distance 71 from the mirror 30 to the back of the front seat, distance 74 between the bottom of the mirror 30 and the top of the front seat, distance 75 between the shared vehicle floor and the bottom of the front seat, distance 77 between the front of the shared vehicle cabin and the lumbar position of the front seat, distance 78 between the front of the shared vehicle cabin and front of the lower portion of the front seat, distance 79 between the accelerator pedal and the front of the lower portion of the front seat, distance 81 between the accelerator pedal and the front of the lower portion of the front seat.

FIG. 21 The VOC 405 utilizes a combination of known vehicle seat dimensions (e.g., lumbar, bottom front portion, range of angle between lumbar portion and bottom front portion, accelerator pedal position) and actuator positions to calculate all aforementioned distances and angles, These parameters are stored within a database for each vehicle type including virtual angles and virtual dimensions utilized to enable accurate prediction of user preferred vehicle settings for vehicles in which the user has never driven.

Figure 22:
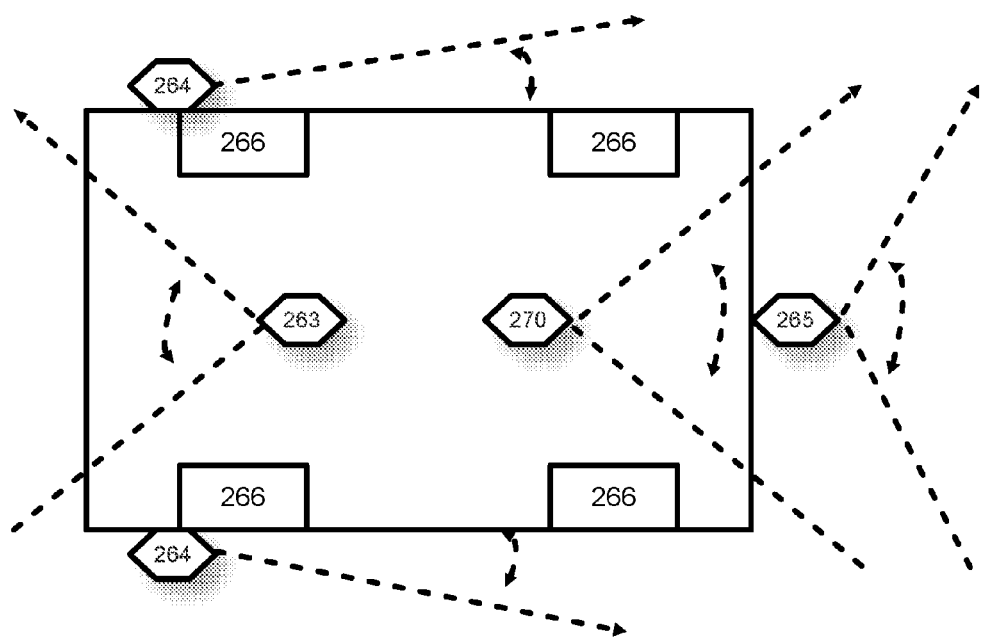
FIG. 22 is a top view depicting camera viewing angle during driving mode.

FIG. 22-FIG. 32 depicts the camera viewing angle for the front camera 263, middle camera 270, rear camera 265, and side camera 264 for each shared vehicle (showing tires as 266) operating mode. FIG. 22 depicts the driving mode where front camera 263 is forward facing, middle camera 270 is rear facing (operable as rearview mirror), rear camera 265 is backward facing, and side camera 264 is backward facing towards blindspot.

Figure 23:
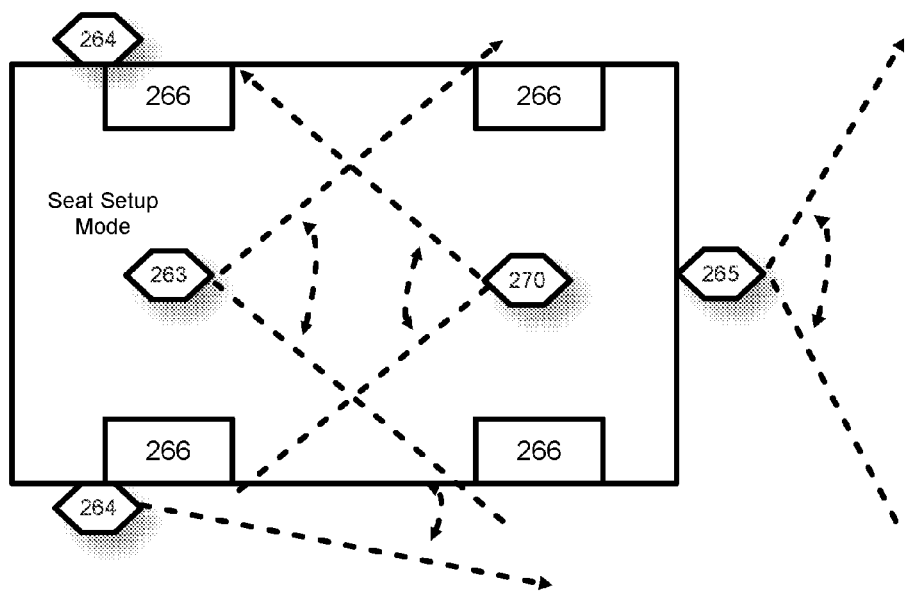
FIG. 23 is a top view depicting camera viewing angle during seat setup mode.

FIG. 23 depicts the seat setup mode where front camera 263 is rear facing, middle camera 270 is front facing, rear camera 265 is backward facing, and side camera 264 is backward facing towards blindspot.

Figure 24:
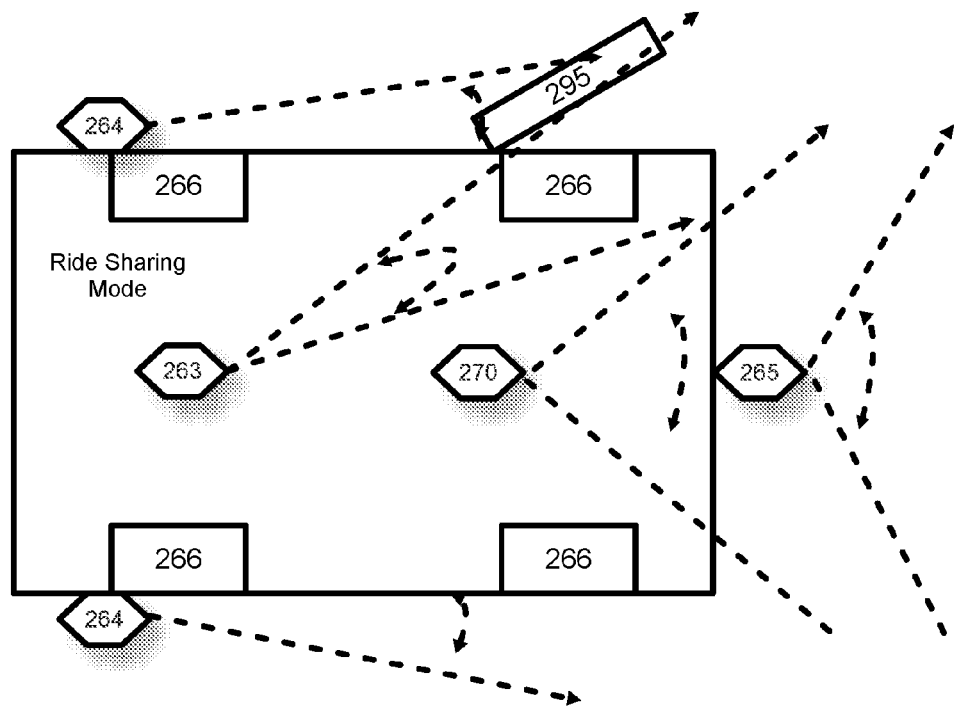
FIG. 24 is a top view depicting camera viewing angle during ride sharing mode.

FIG. 24 depicts the ride sharing mode where front camera 263 is sideways facing, middle camera 270 is rear facing (operable as rearview mirror), rear camera 265 is backward facing, and side camera 264 is backward facing towards blindspot. The front camera is operable at an angle to see passenger entering the shared vehicle in which the door 295 is open. The middle camera angle may also vary the angle in accordance to the door that is ajar. The visual record obtained is a combination of the side camera 264, the front camera 263, and the middle camera 270 creating a panoramic view around the shared vehicle.

Figure 25:
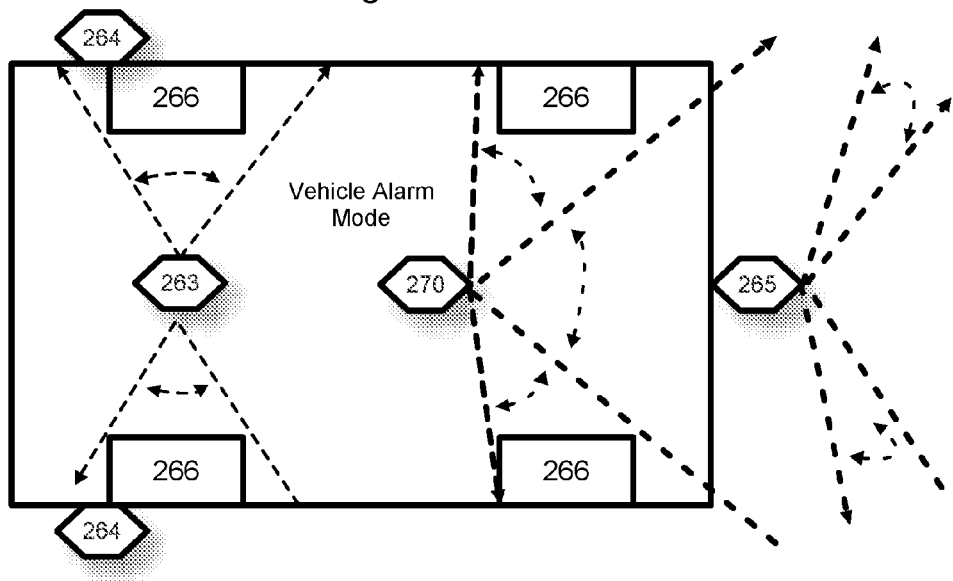
FIG. 25 is a top view depicting camera viewing angle during vehicle alarm mode.

FIG. 25 depicts the vehicle alarm mode where front camera 263 is sideways facing at least one of the two front doors, middle camera 270 is sideways facing at least one of the two rear doors and/or rear facing, rear camera 265 is backward facing, and side camera 264 is backward facing towards blindspot. Any of the cameras is preferable operable at an angle to see person entering the shared vehicle in which the door 295 is open. The middle camera angle may also vary the angle in accordance to the door that is ajar. The visual record obtained is a combination of the side camera 264, the front camera 263, the middle camera 270, and the rear facing camera 265 creating a panoramic view around the shared vehicle.

Figure 26:
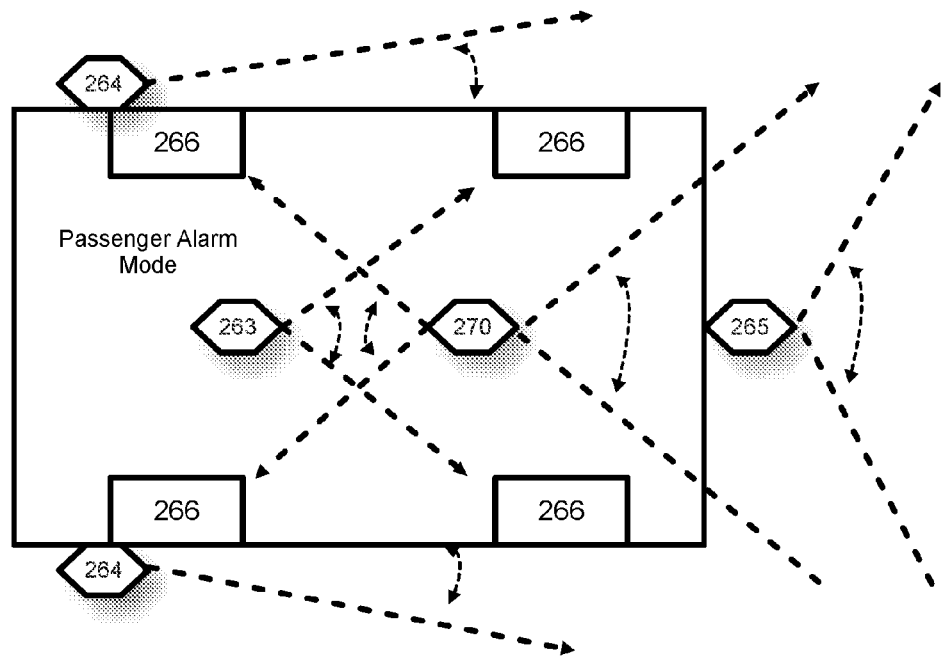
FIG. 26 is a top view depicting camera viewing angle during passenger alarm mode.

FIG. 26 depicts the passenger alarm mode where front camera 263 begins at a rear facing position and scans thereafter between the left and right front doors, the middle camera 270 begins as rear facing and scans between the two rear doors and then forward facing to view the frontal exterior area of the shared vehicle, rear camera 265 is backward facing, and side camera 264 is backward facing towards blindspot. Any of the cameras is preferable operable at an angle to see passengers within the shared vehicle and preferentially is positioned towards the door 295 that is open. The middle camera angle may also vary the angle in accordance to the door that is ajar. The visual record obtained is a combination of the side camera 264, the front camera 263, the middle camera 270, and the rear facing camera 265 creating a panoramic view around the shared vehicle. It is understood in the art that any of the cameras viewing angle can scan by either mechanically moving the camera position through the use of camera actuators, electronically by moving a lens reflector, or optically by zooming in or out within a wide viewing angle (including the use of a fish eye lens).

Figure 27:
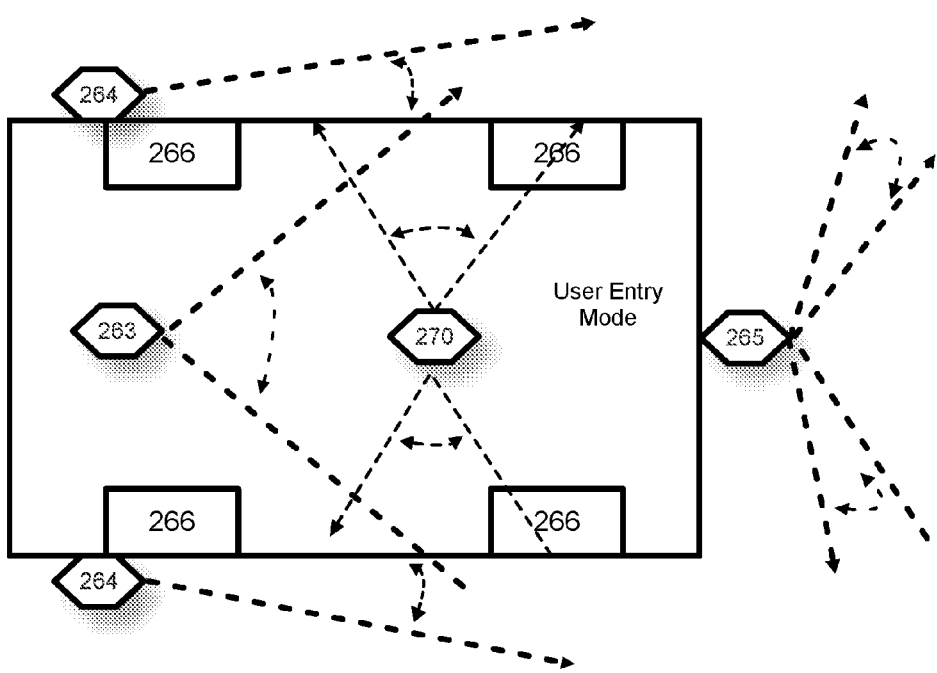
FIG. 27 is a top view depicting camera viewing angle during user entry mode.

FIG. 27 depicts the user entry mode where front camera 263 begins at a rear facing position and scans thereafter between the left and right front doors, the middle camera 270 begins as rear facing and scans between the two rear doors and then forward facing to view the frontal exterior area of the shared vehicle, rear camera 265 is backward facing, and side camera 264 is backward facing towards blindspot. Any of the cameras is preferable operable at an angle to maximize visibility within the shared vehicle and preferentially is positioned towards the door 295 that is open. The middle camera angle may also vary the angle in accordance to the door that is ajar. The visual record obtained is a combination of the side camera 264, the front camera 263, the middle camera 270, and the rear facing camera 265 creating a panoramic view around the shared vehicle. It is understood in the art that any of the cameras viewing angle can scan by either mechanically moving the camera position through the use of camera actuators, electronically by moving a lens reflector, or optically by zooming in or out within a wide viewing angle (including the use of a fish eye lens).

Figure 28:
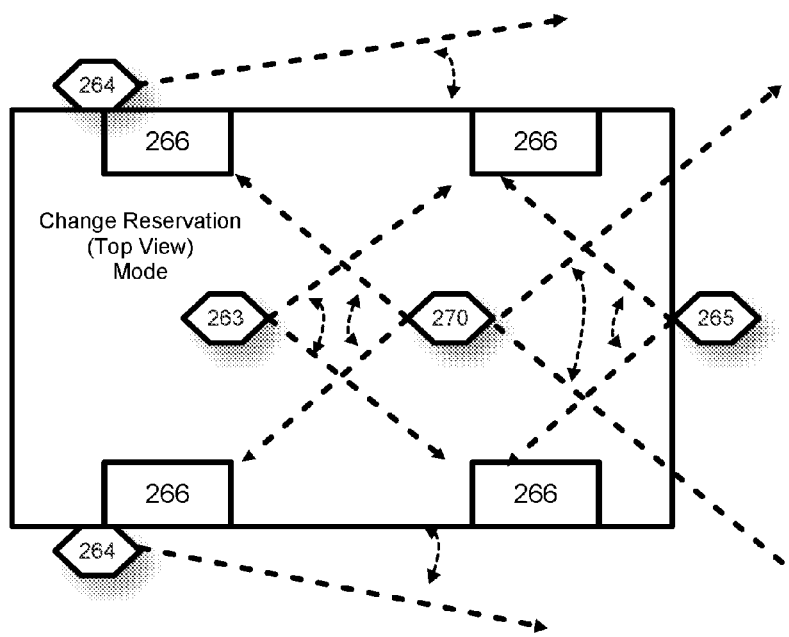
FIG. 28 is a top view depicting camera viewing angle during change reservation mode.

FIG. 28 depicts the top view for the change reservation mode where front camera 263 begins at a rear facing position and scans thereafter between the left and right front doors and between the bottom of the front seat to the top of the front seat, the middle camera 270 begins as rear facing and scans between the two rear doors and between the bottom of the rear seat and the top of the rear seat, then forward facing to view the front of the cabin area of the shared vehicle scanning between the dashboard, the accelerator/decelerator pedal area and the front floor mat area, rear camera 265 is forward facing whereas the trunk of the shared vehicle is open and the rear camera views the interior of the trunk, and side camera 264 is backward facing towards blindspot whereas the side camera 264 provides a visual record of the front portion of the shared vehicle exterior. Any of the cameras is preferable operable at an angle to see interior within the shared vehicle and preferentially is positioned towards the seats (as the majority of damage occurs on seats). The middle camera angle may also vary the angle in accordance to the user as driver and prior passenger location. The visual record obtained is a combination of the side camera 264, the front camera 263, the middle camera 270, and the rear facing camera 265 creating a panoramic view within the interior of the shared vehicle. It is understood in the art that any of the cameras viewing angle can scan by either mechanically moving the camera position through the use of camera actuators, electronically by moving a lens reflector, or optically by zooming in or out within a wide viewing angle (including the use of a fish eye lens).

Figure 29:
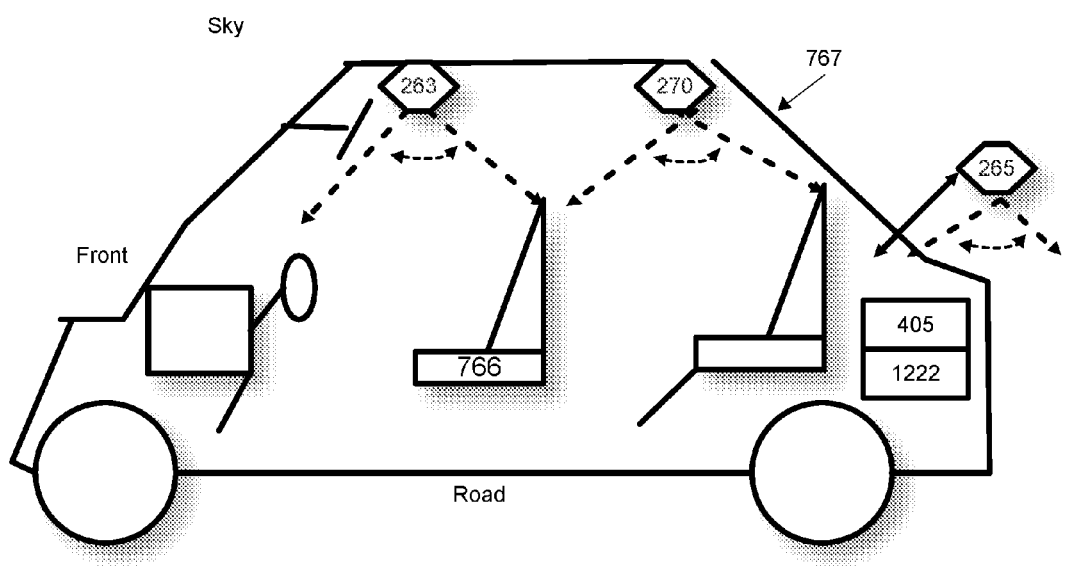
FIG. 29 is a side view depicting camera viewing angle during change reservation mode.

FIG. 29 depicts the side view for the change reservation mode where front camera 263 begins at a rear facing position and scans thereafter between the left and right front doors and between the bottom of the front seat to the top of the front seat, the middle camera 270 begins as rear facing and scans between the two rear doors and between the bottom of the rear seat and the top of the rear seat, then forward facing to view the front of the cabin area of the shared vehicle scanning between the dashboard, the accelerator/decelerator pedal area and the front floor mat area, rear camera 265 is forward facing whereas the trunk 265 of the shared vehicle is open and the rear camera views the interior of the trunk, and side camera 264 is backward facing towards blindspot whereas the side camera 264 provides a visual record of the front portion of the shared vehicle exterior. Any of the cameras is preferable operable at an angle to see interior within the shared vehicle and preferentially is positioned towards the seats (as the majority of damage occurs on seats). The middle camera angle may also vary the angle in accordance to the user as driver and prior passenger location. The visual record obtained is a combination of the side camera 264, the front camera 263, the middle camera 270, and the rear facing camera 265 creating a panoramic view within the interior of the shared vehicle. It is understood in the art that any of the cameras viewing angle can scan by either mechanically moving the camera position through the use of camera actuators, electronically by moving a lens reflector, or optically by zooming in or out within a wide viewing angle (including the use of a fish eye lens).

Figure 30:
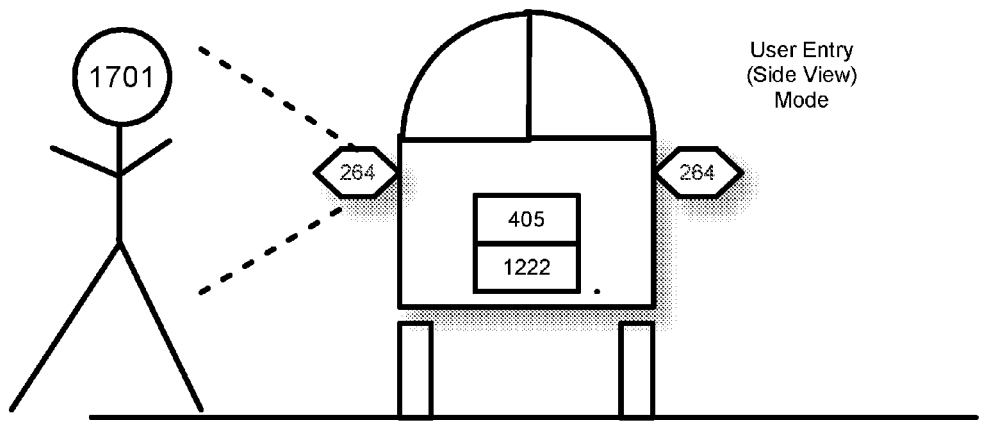
FIG. 30 is a rear view depicting camera viewing angle during user entry mode.

FIG. 30 is a side view from the rear of the shared vehicle depicting the side camera 264 facing the user as driver entry position such that the VOC 405 utilizes the visual record of the user for the purpose of: a) biometric data such that VOC 405 calculates driver height, weight, lower body portion (from waist to the floor), torso height, arm length, inseam length, etc. b) compare biometric data acquired to user profile such that factors including high-heels, boots, etc enable the VOC 405 to make adjustments to the user preferred vehicle settings accordingly, c) verification of user (as driver), and d) anti-theft deterrent.

Figure 31:
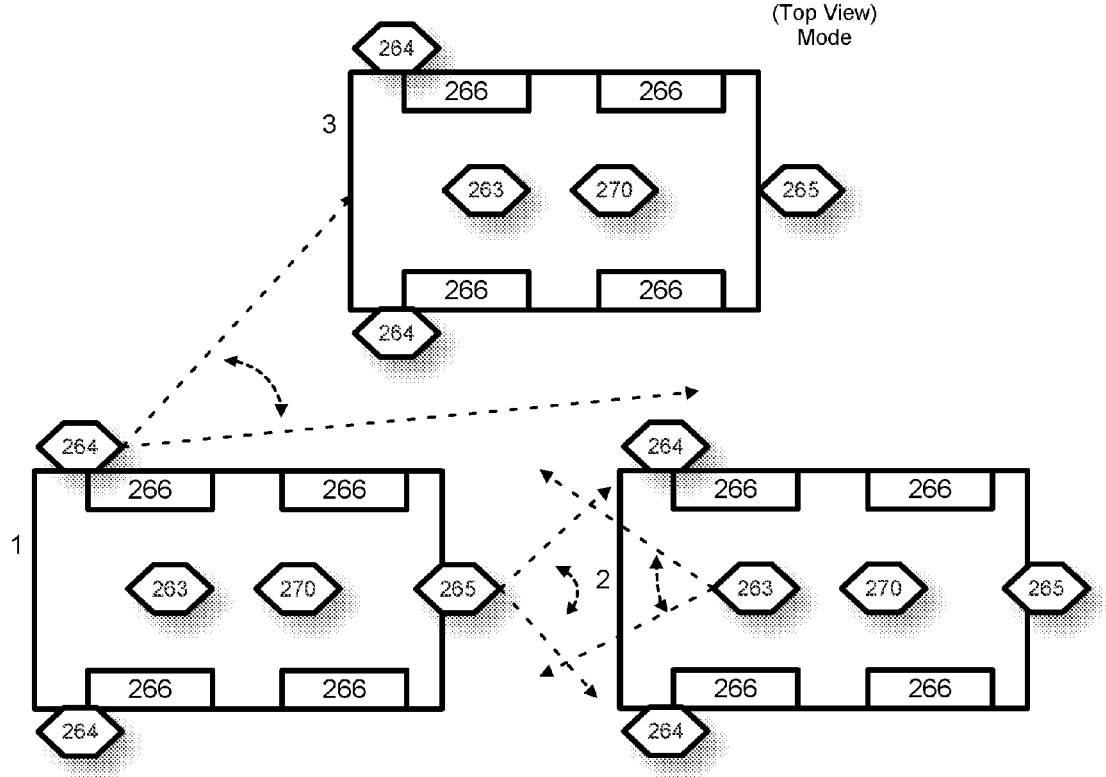
FIG. 31 is a top view depicting camera viewing angles during automated moving mode.

FIG. 31 is a top view of automated movement mode depicting three shared vehicles 1, 2, and 3 in relative position to each other. The side camera is rear facing to view blindspot and notably the angle between shared vehicles (as shown between vehicle #1 and #3), the rear camera is backward facing to view vehicle behind it and notably the distance between shared vehicles (as shown between vehicle #1 and #2), and front camera is forward facing to further validate the distance between shared vehicles (as shown between vehicle #1 and #2).

Figure 32:
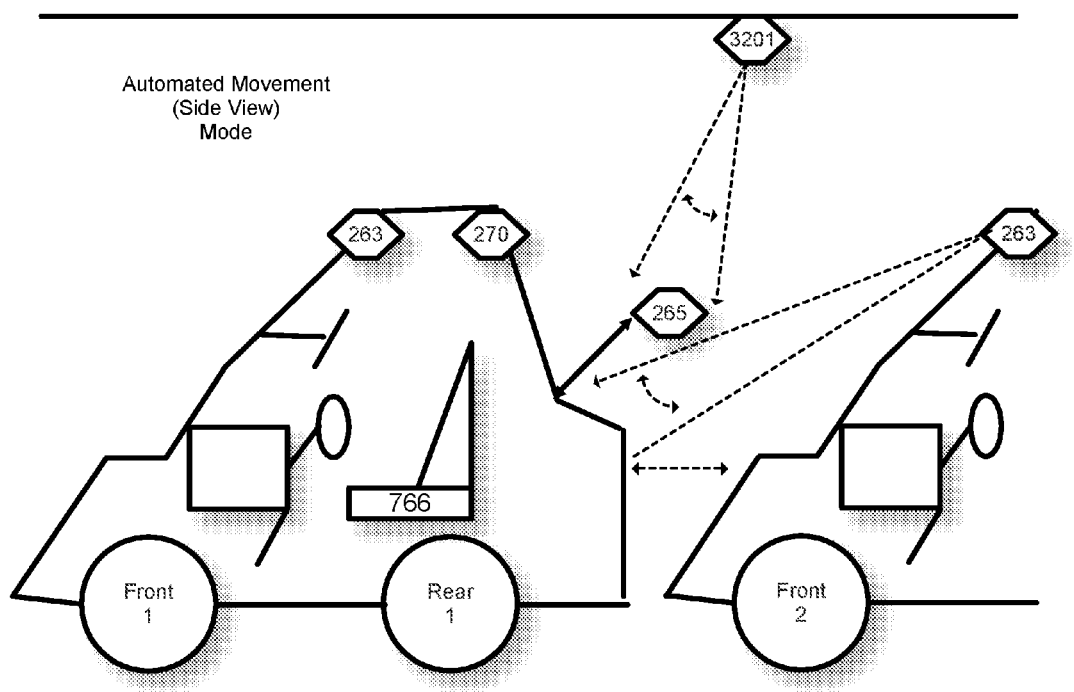
FIG. 32 is a side view depicting camera viewing angle during automated moving mode.

FIG. 32 is a side view of automated movement mode as an alternative mode in which a camera 3201 mounted above the shared vehicles is operable to scan the contents within the trunk, the forward facing camera 263 of shared vehicle #2 is also operable to scan the contents within the trunk of the shared vehicle in front, and lastly depicts a representative communications link to enable VOCs of each respective vehicle to communicate exchanging visual images (i.e., pictures) taken by one vehicle's cameras to the other vehicle.

A user of a shared-use vehicle may often travel the same route with the shared-use vehicle every day, for example, by commuting to and from a workplace. In such a situation, the computer may average the actual wear sustained by the vehicle resulting from traversing this same route. If the actual wear sustained by the vehicle substantially exceeds the average actual wear associated with the route, the user may be assessed an "abuse" fee. In another embodiment, the computer may average the actual wear sustained by a number of vehicles operated by a number of users who have all traversed the same route. A subsequent user who travels this same route and whose vehicle incurs actual vehicle wear in excess of the average actual vehicle wear may be assessed an "abuse" fee.

The onboard computer 405 may contact a Package Management System (PMS) to take care of further details regarding personal items left behind by the user. The PMS would contact the user about whether or not the user needed the package immediately. The package could then be moved to an offboard storage area so that the car would then be free to be used by someone else.

Figure 33:
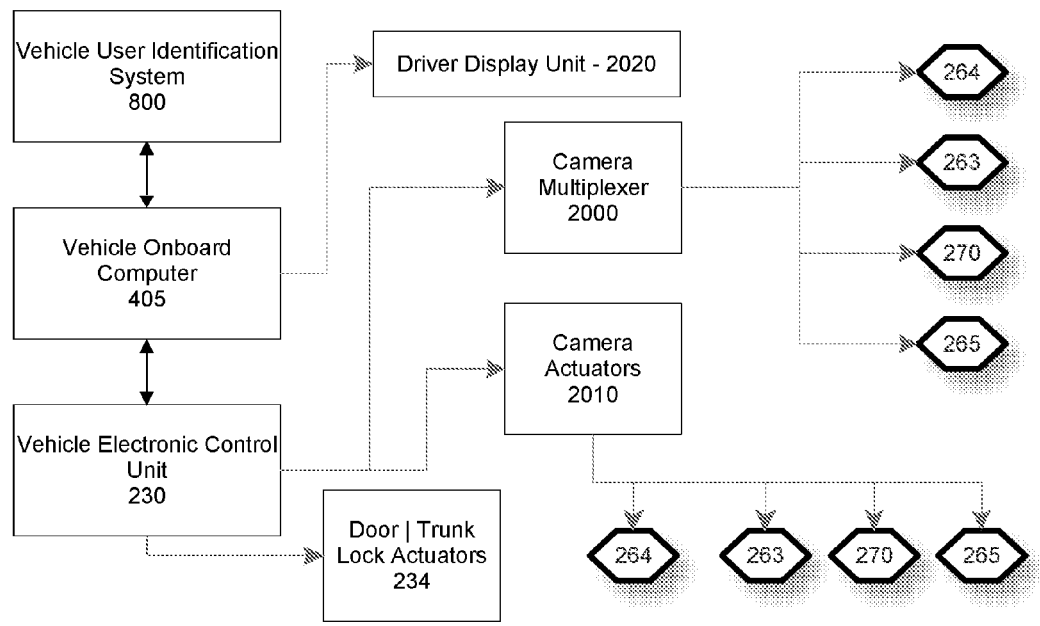
FIG. 33 is a system architecture depicting multiplexing of cameras as all cameras are never needed concurrently in the various modes.

FIG. 33 is a system schematic view, depicting explicitly components that were implied in earlier figures and in the specification. The Vehicle Onboard Computer 405 is connected as known in the art, whether by physical communications or wireless communications, to the Vehicle User Identification System "VUID" 800 and the Vehicle Electronic Control Unit "VECU" 230 for control of the major components recognized within a modern vehicle (though not depicted, e.g., engine, anti-lock brakes,etc.) plus specific components particularly noted in the invention which are Camera Multiplexer 2000, Camera Actuators 2010, Door-|Trunk Lock Actuators 234. The Camera Actuators 2010 are provided to change the view angle (or to scan) as a function of the vehicle mode. The Camera Multiplexer 2000 is utilized in similar manner as known in the art, but in the invention is critical to reducing the cost of a large number of cameras. This is feasible as there are no circumstances in which all cameras are needed concurrently within any individual vehicle mode. The Driver Display Unit 2020 is any one (or series) of graphical user interfaces as known in the art, furthermore the wide range of user inputs (e.g., touch, multi-touch, haptic feedback, etc.) are anticipated. The Camera Multiplexer 2000 switches the video signal between the respective cameras 264, 263, 270, and 265 (plus any other camera that is not utilized on a continuous basis, though not depicted). It is understood that the Camera Multiplexer 2000 can have multiple concurrent feed streams, though the number of concurrent feed streams will always be at least one less than the total number of cameras connected to the Camera Multiplexer 2000. The Camera Actuators 2010 moves the camera to switch the viewing angle such that any of the connected cameras which are at least cameras 264, 263, 270, and 265 in accordance to the vehicle mode and/or the entry/exit of passengers for ride-sharing and/or acceptance/discharge of packages to be transported whether it be in the generally utilized trunk or in more secure trunk/container having controlled access. The Door-|Trunk Lock Actuators 234 control, as note though not depicted, at least one door of the vehicle and/or at least one trunk of the vehicle. The position of the respective actuators is in accordance to the various vehicle modes with the specific purpose of controlling access and/or providing security, but always within the rules/logic in accordance to the vehicle operating mode.

Figure 34:
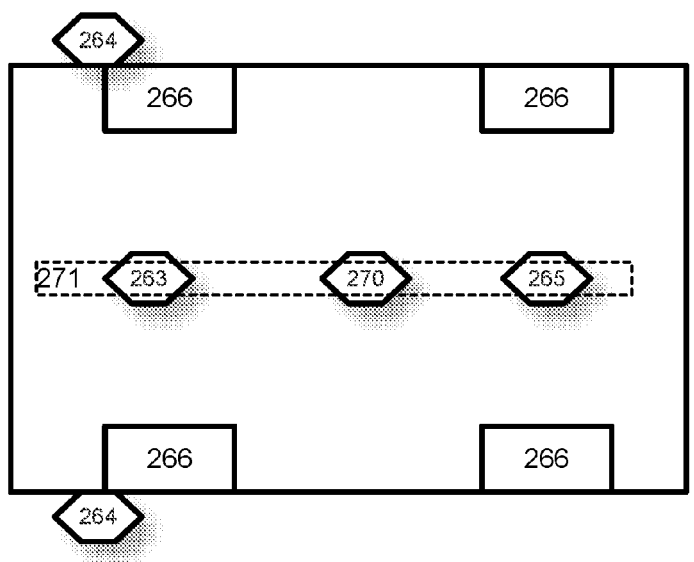
FIG. 34 is a top view depicting multiple cameras in their respective "normal" positions.

FIG. 34 is a top down view of the vehicle. In FIG. 34, the placement of the various cameras (as defined earlier) noted as camera 264, 263, 270, and 265. A track guide 271 exists, though not always required, to provide a controlled movement plane for the cameras to extend the viewing angle as compared to a fixed stationary point (even with the presence of the aforementioned camera actuators). The tires 266 are present to simply provide relative placement of the cameras in relationship to the vehicle.

Figure 35:
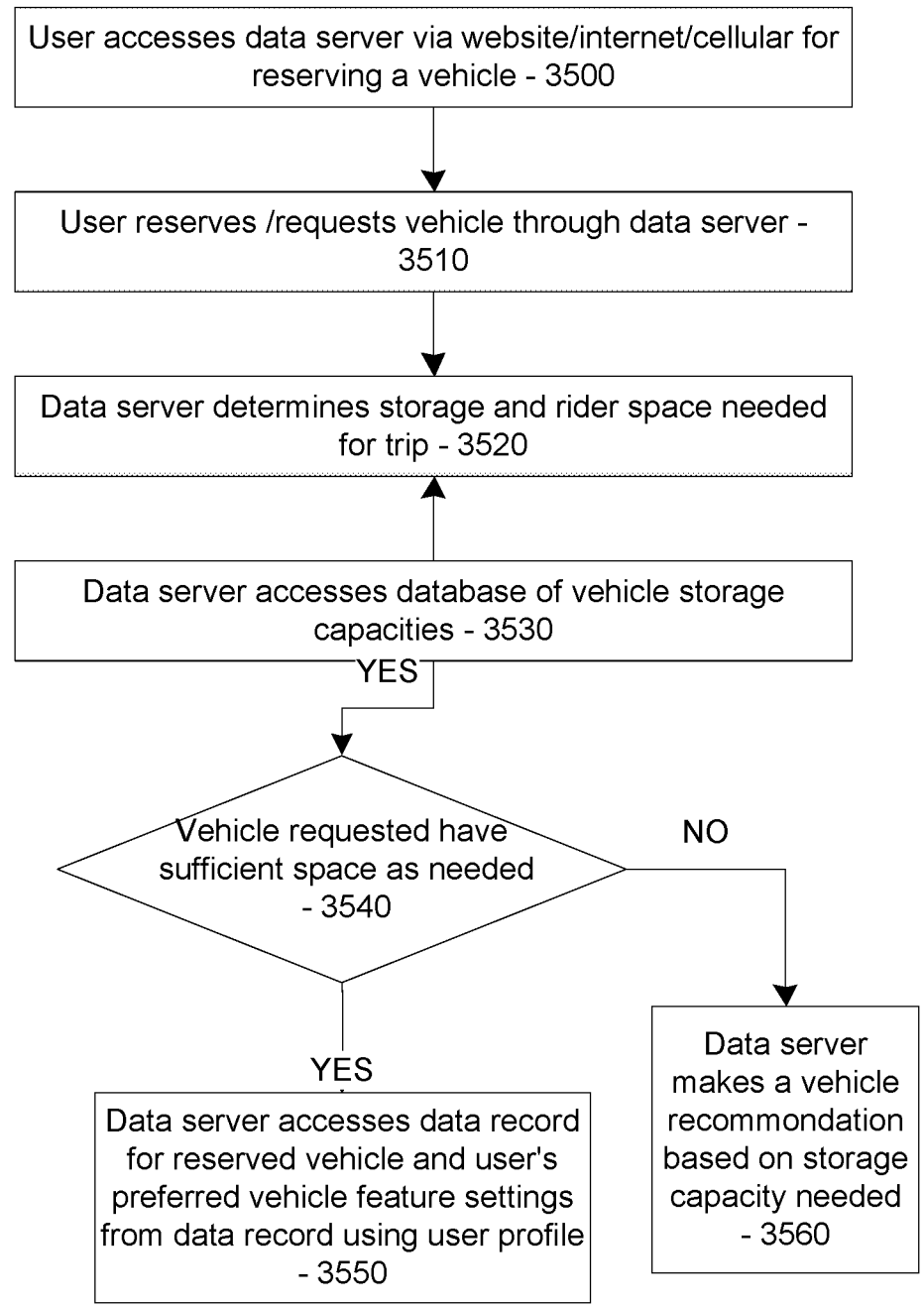
FIG. 35 is a flowchart diagramming the process of vehicle sizing while operating with shared rides within the fleet of shared vehicles.

FIG. 35 is a flowchart for vehicle sizing. In FIG. 35 are the sequential processes for the user accessing the data server remotely (e.g., website, internet, cellular phone, etc.) as known in the art to reserve a vehicle 3500. The user reserves/requests a vehicle through the data server 3510, though in the majority of cases the vehicle size is not selected but rather determined by the data server 3510. The data server first determines the projected storage and rider space required for the trip 3520. One the projected space storage and space requirements are known (or at least anticipated), the data server 3510 accesses the database containing the vehicle storage capacities for vehicles available (or projected to be available) 3530. A decision block is subsequently processed based on the matching of storage space requirements to available space 3540. Vehicles having sufficient space available within the pool of vehicle candidates have those vehicles contained within the set, with further down-selection based on the user profile preferences 3550. When insufficient space is available, the data server 3510 makes a vehicle recommendation based on the storage space needed 3560. Alternatively, the vehicle space requirements are adjusted by utilizing alternative vehicle as transport independent.

The data server 3510 is used to determine if the storage of a vehicle is being used to capacity. If the storage area is not being used to capacity the Package Management System "PMS" system determines what packages are available to be sent to the destination of the vehicle. The PMS system will determine what security measures are needed and the packages will be stored in the vehicle accordingly. The PMS system will then send that information to the VOC. If the driver will be using the truck the packages are stored in locked compartments under the seats. If the driver will only be using interior storage the packages will be stored in the trunk and the trunk will remain locked. If the driver is using part of the trunk the packages can be stored in locked compartments within the trunk. The driver will not be made aware that there are packages stored in the car.

Figure 36:
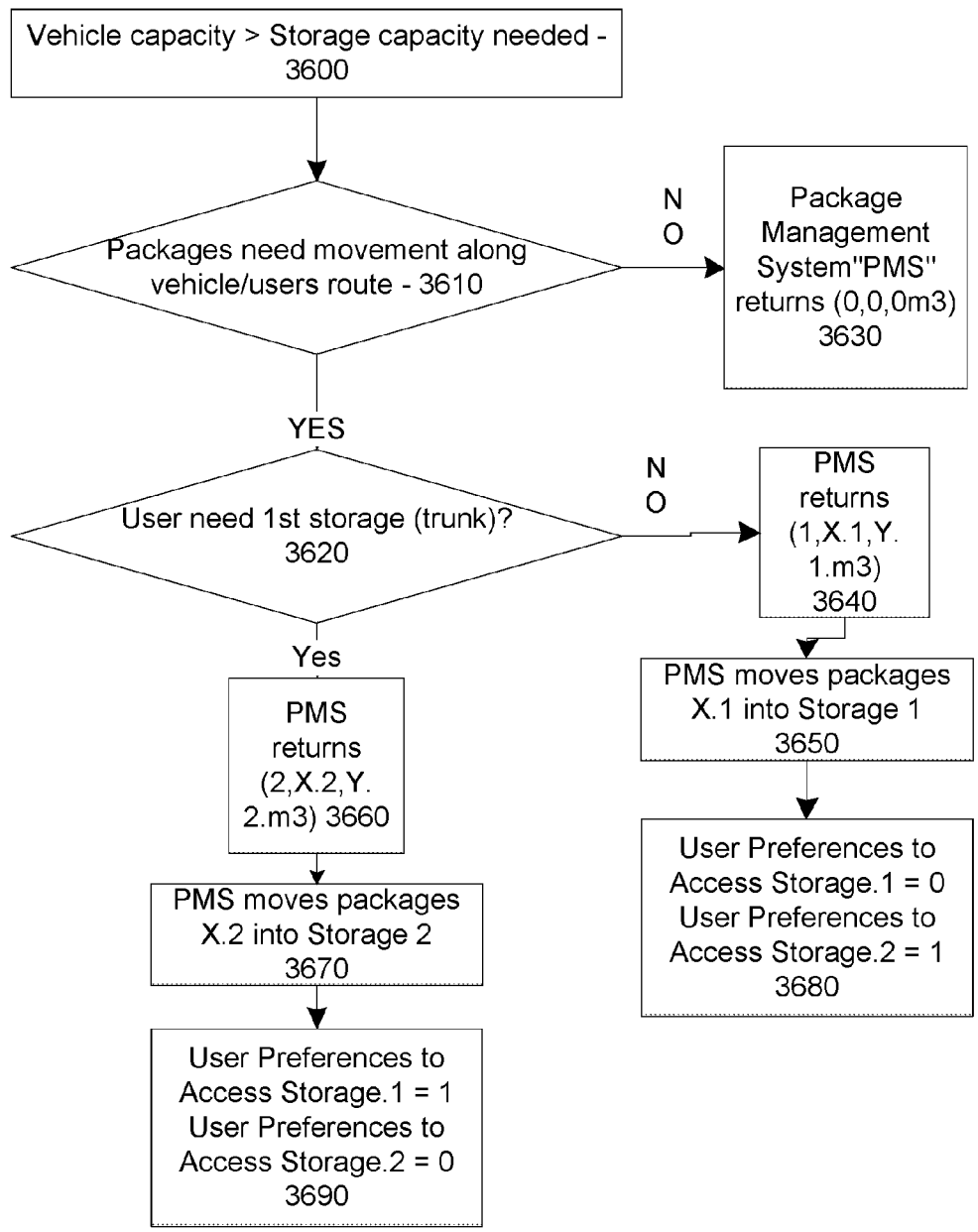
FIG. 36 is a flowchart diagramming the process of "cargo" movement within the fleet of vehicles.

FIG. 36 is a logic flowchart as used for both vehicle sizing and also for securing packages (i.e., interchangeably used with containers). The vehicle, which has a fixed storage capacity comprised of at least one storage device. The 1st storage is referred to as the trunk (or boot). A 2nd storage is another storage device preferably utilized as providing more secure access to packages, such as when driver and/or passengers should have either controlled access or no access to packages within the 2nd storage compartment. It is understood that either the 1st storage or the 2nd storage interchangeably. Also that either the driver, the passenger, or yet another person has controlled access is anticipated by the disclosed invention.

In the disclosed invention, the Package Management System "PMS" controls the movement of packages/containers from one physical place to another by way of the vehicle. When the Vehicle capacity is greater than the Storage capacity needed 3600, the PMS determines if any, and which packages can be down-selected for movement along the vehicle/users route 3610. In the event that the PMS doesn't locate any package candidates 3630, the PMS returns a null value for each of the parameters (width of collective boxes into 1.X, depth of collective boxes into 1.Y, and total volume of collective boxes into 1.m3) 3640 here as indicated for the 1st storage. The PMS coordinates the movement of the packages X.1 into the 1st storage "trunk" Storage 1 3650. The PMS then modifies the access privileges accordingly, in this instance since the User's packages are not in the 1st Storage, this particular User does not gain access to 1st Storage by setting Access Storage.1 to null value (i.e., false). In this instance the package(s) are able to be accessed by User in the 2nd Storage 3680.

The process above is representative of packages, and is repeated when packages are either reserved, full. or controlled access is desired within the 1st storage; therefore the PMS utilizes the Storage 2 without impacting the driver/User's access to the 1st Storage "trunk". The PMS moves packages, as known in the art (e.g., ASRS) into Storage 2 3670 and sets the access privileges accordingly as 3690.

It is further understood that each vehicle can have more storage devices than the 2 indicated, and that the PMS can control access to each of the storage devices. And furthermore, the PMS can in fact request a larger vehicle to be utilized to transport packages between at least 2 points even when the vehicle passenger capacity is in excess than the actual passenger (rider/user) requirement for any one routing segment or the entire route for the selected vehicle.

Figure 37:
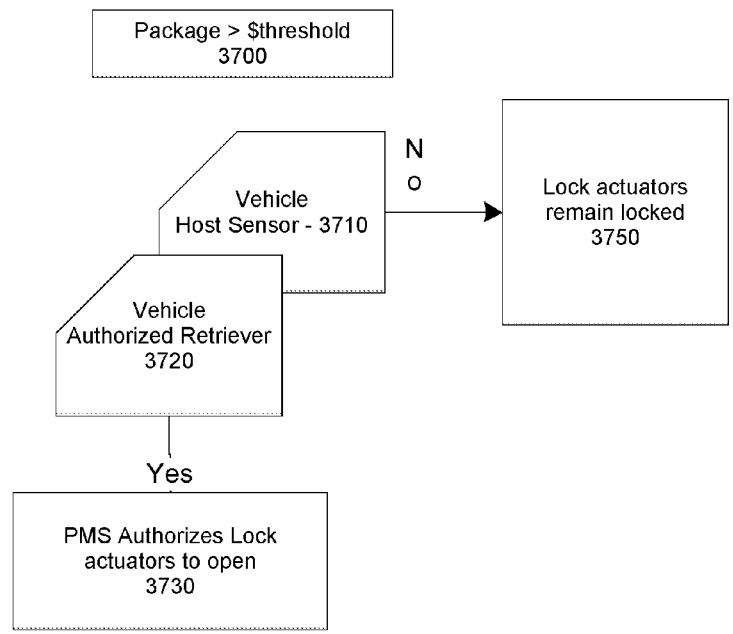
FIG. 37 is a flowchart diagramming the process of securing especially valuable "cargo" not owned by the driver of the vehicle.

FIG. 37 is a simple process flow chart indicating logic for packages that exceed a dollar threshold 3700. In FIG. 37 the packages being stored in the vehicle are worth more than a determined dollar amount. If the package is more than that dollar amount than the storage area will not unlock until the package is at the expected location and the expected person or robot is there to collect it. The location and the authorized retriever will have electronic sensors that the VOC will recognize and communicate to the Package Management System which will communicate back whether or not the locks should be open. The Vehicle Host Sensor 3710 is at least one sensor and anticipated to be a sophisticated control system to recognize the presence of a Vehicle Authorized Retriever 3720 within an approved geofence for the specific vehicle and/or storage compartment. If the Vehicle Host Sensor 3710 either fails to detect the presence of any user, or the detected "retriever" is not authorized for access, the Lock actuators remained locked 3750. Only when a Vehicle Authorized Retriever 3720 is both detected and within the allowed proximity of either the vehicle and/or package storage compartment geofence are overlapping.

It is further understood that the PMS is anticipated to have a sophisticated set of rules that enable access to packages stored within the vehicles compartments/storage devices such that a Vehicle Authorized Retriever could be a relative, friend, or secondary authorized person. It is further understood that more detailed procedures are anticipated for increasing value of the package contents, including access further limited by requiring the vehicle to be within specific locations (identified by geofences) for the vehicle itself and/or the Vehicle Authorized Retriever.

Figure 38:
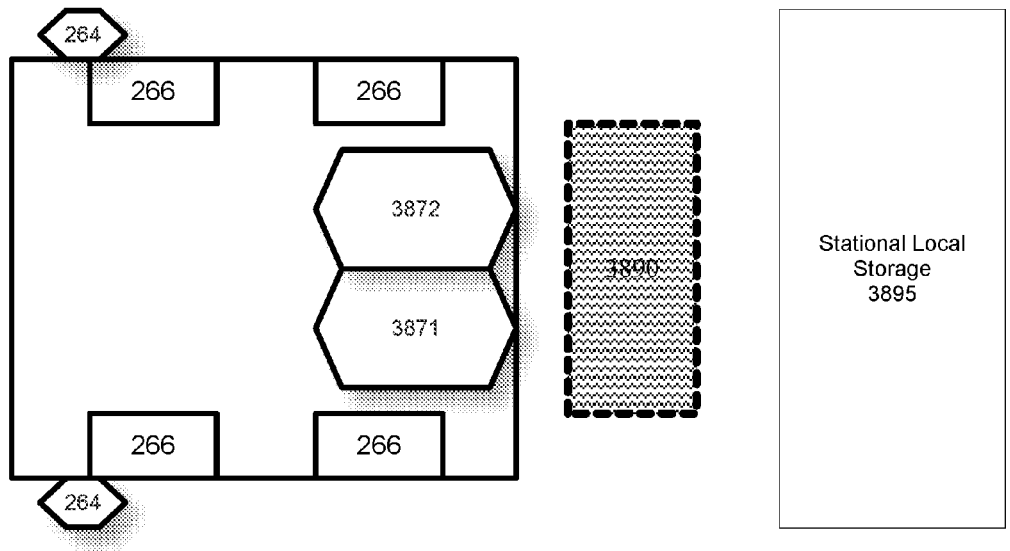
FIG. 38 is a top down view depicting an extension of the Package Management System "PMS".

FIG. 38 is a top down view depicting an extension of the Package Management System "PMS". FIG. 38 depicts the aforementioned camera(s) 264 and tires 266 in addition to the newly depicted 1st storage (aka trunk) 3871 and at least one second storage 3872. The PMS has an automated method of removing either the storage device itself or simply the packages within the storage device such as shown by a robot/shuttle 3890. The robot/shuttle 3890 has the ability to either transfer or take the removed packages to a Stationary Local Storage 3895 (or to remove from the 3895 and place into the vehicle storages 3871 or 3872) in accordance to the logic within the PMS.

Figure 39:
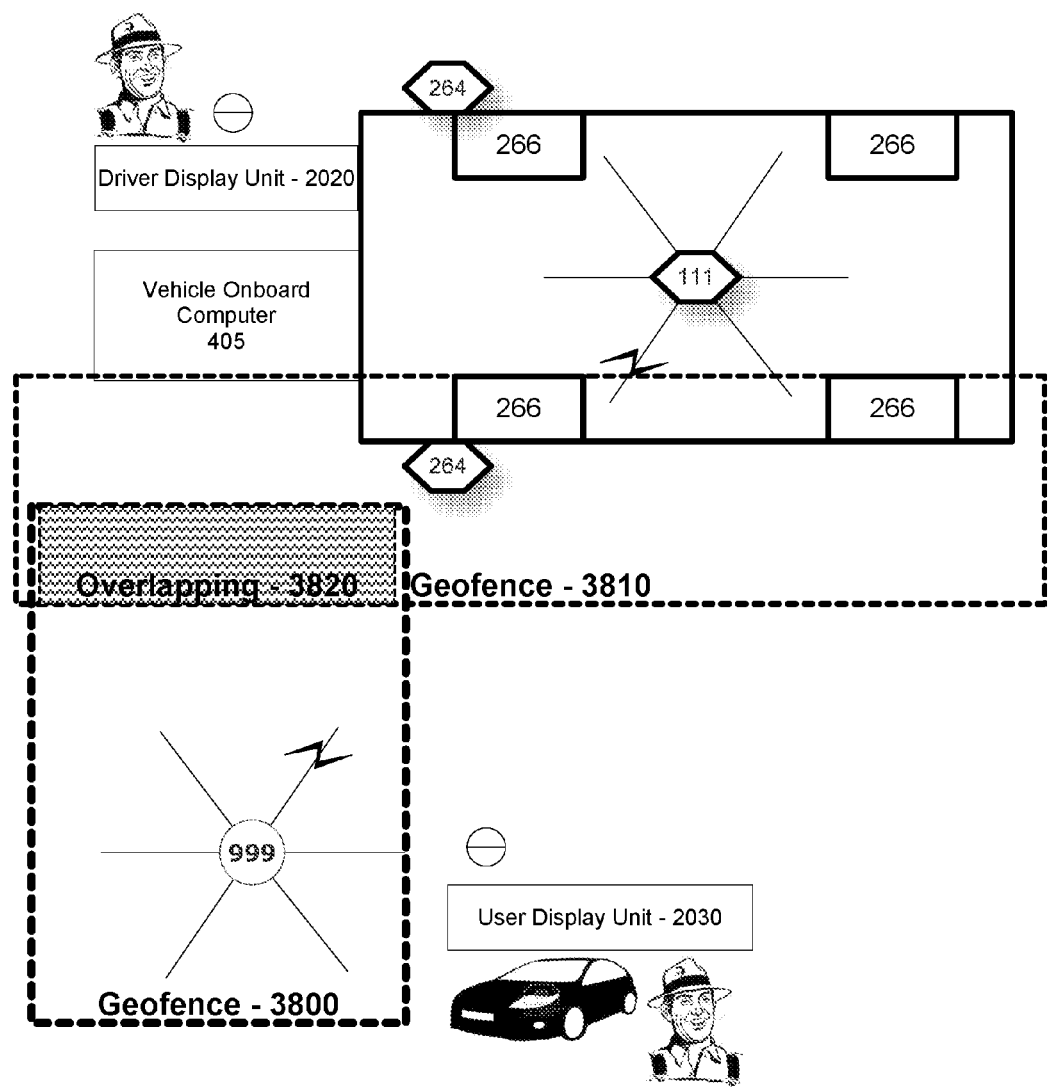
FIG. 39 is a system architecture of the vehicle and ride sharer display units, depicted as a top view only in terms of directional indicators.

FIG. 39 is a cartoon view, with the exception of a top down view for the vector directional map portion, depicting interaction between vehicle and an entering passenger/rider. FIG. 39, within the top portion, depicts a vehicle showing camera(s) 264, tires 266, and a vehicle vector detector system 111 capable of showing the directional vector between the vehicle and an external (relative to the vehicle) object. The vehicle has a geofence 3810 that establishes an active zone(s) in which the vehicle vector detector system 111 actively seeks and indicates the relative position of objects having known in the art methods to determine distance (in at least 1 dimensional space, though preferably in a 3 dimensional space). The vehicle has both a Driver Display Unit 2020 (can integrate a user interface) in bi-directional communication to the Vehicle Onboard Computer 405. The Driver Display Unit 2020 has the capability to show a wide range of common vehicle parameters as known in the art, but notably a vector directional system to indicate the presence (and distance) of objects programmed to be sought. The Vehicle Onboard Computer 405 has either or both of a computer program or control system that operates a location based system with integral language addressing at least two geofences and their inter-relationship (e.g., approaching, leaving, overlapping, etc.). The bottom portion of the figure is from the user/passenger perspective. The user/passenger interacting with the vehicle, whether directly with the Vehicle Onboard Computer 405 or remotely through wireless methods as known in the art (e.g., cellular, WiFi, etc.) to a data server program (not depicted). As such, the user/passenger has a User Display Unit 2030 that has a wide range of interactive buttons (not depicted) and notably a user vector directional system 999 that shows the active relative position of the vehicle. The user has a geofence 3800 that is an active region for the user, such that an externally interacting system or a microprocessor/computer in communication or co-located with the User Display Unit 2030. One representative interaction between the two geofences respectively of the vehicle 3810 and the user/passenger 3800 is depicted by the overlapping area 3820.

The ride sharing management system has the inventive feature of providing active vector directional control and at least one geofence for enabling the safe and effective ability for user/passengers to enter the vehicle that will transport the boarding user/passenger to a "next" destination.

Each display, both the vehicle and the user respectively show a picture of the user/passenger to board the vehicle and a picture of the driver (and/or other fellow passengers). It is preferable for each display to have a "safe" indicator so that both the driver and/or the user/passenger know that it is safe for the user/passenger to enter the vehicle. Furthermore, it is particularly preferred that the Vehicle Onboard Computer 405 prevents the vehicle from moving until the user/passenger has safely entered the vehicle and doesn't move until such time at a minimum that the doors of the vehicle are closed. One such indicator is that the user/passenger position is entirely within the vehicle or at a minimum the user/passenger has fully left the external portion of the vehicle geofence 3810.

In FIG. 39 the data server contacts a Rider Management system. In this document, rider and passenger will be used interchangeably. The data server determines if there is room in the car for passengers and if the actual driver is willing to ride share. The data server contacts the Ride Management System to determine if there are any riders scheduled for the same route. The RMS system then sends pictures of the riders to VOC and drivers cell phone. The cameras in the car take a picture of the driver and send the picture to the RMS to send to the designated riders. When the driver arrives at the location to pick up the riders the cameras take a picture of the riders and compare the picture pictures sent by the RMS. If they are the same the lock actuators are set to unlock. The cameras then take as store periodic pictures of the interior of the car so if there are discrepancies when the final photographs are taken the system has documented who left non-refuse or refuse materials in the car. Pictures of the passenger areas are photographed when the riders leave the car.

It is further understood by the combination of figures, that the vehicle lock actuator for the vehicle door(s) having the "normal" operations as known in the art, but notably added per the disclosed invention is that the vehicle lock actuator locks/unlocks the door(s) in combination with vehicle conditions AND the vehicle location indicating global position by GPS as known in the art. And also in conjunction with the user/passenger boarding (or leaving) the vehicle with the user/passenger locating indicated by global position by GPS as known in the art. The reference to the GPS is understood to include indoor GPS, or any other method as known in the art to establish the relative vector distances (in at least 1 axis) between the vehicle and the user/passenger/rider.

An exemplary of the full system in operation is as follows, but it is not restrictive in terms of individual operations or collective operations. The shared-use vehicle management system has a fleet of vehicles that are available to be driven by an actual driver or providing ferry services for passenger(s)/user(s)/rider(s) which are used interchangeably. Any individual vehicle can be driven by any set of potential drivers (also referred to as candidate drivers, such that at least two candidate drivers exist referred to in principle as a first driver, a second driver, etc.). Any of the vehicles is outfitted with at least one storage compartment (i.e., trunk, partitioned lockers, etc.), an onboard computer, a controller to at least control lock actuators on the storage compartment(s) to remotely lock and/or unlock the storage compartment(s) and therefore provide selective access to the packages within the storage compartments to only authorized retriever(s) of those packages. The authorized retriever(s) can be a driver, a passenger, or a $3^{rd}$ party operator of an offboard storage system that has the ability to automate at least the storage of the package(s) from the shared-use vehicle to the offboard storage system (or vice-versa) and preferably automate the removal (or placement) of package(s) from the shared-use vehicle as known in the art (e.g., robots, shuttles, cranes, etc.). The system as a whole, or individually through the onboard computer communicates with a controller, such that the location of the actual driven vehicle, the location of the actual driver (or user/passenger/rider/$3^{rd}$ party operator) are within allowable tolerance. The use of geofences, as known in the art, control accessibility to packages to only authorized users of the system. To that end, enabling geofence(s) and disabling geofence(s) exist. The controller utilizes these respective geofences to enable the lock actuator to lock/unlock the at least one storage compartment and therefore to control access of the storage compartments only to the authorized user. Even an authorized user is limited to being inside of the at least one enabling geofence or outside of the disabling geofence, or vice-versa (outside of enabling geofence, or inside the disabling geofence).

The inclusion of at least two cameras that have multiple functionality enable the cost of the camera to be amortized across both a forward facing field of view and a rear facing field of view. An actuator move between the forward facing field of view and at least the rear facing field of view (which can also further include a field of view that specifically sees or preferably tracks the position of a user entering the vehicle through the use of a local GPS method having at a minimum the ability to establish a relative directional vector between the vehicle and the user). The preferred embodiment enables both the driver and the user entering the vehicle to clearly see relative location such as through a directional vector (and specifically preferred is the distance between the vehicle and the entering user, and more particularly preferred incorporates the relative velocity of each) which is displayed on a vehicle display unit for the driver and a user display unit for the user entering (or otherwise interacting) the vehicle. The system integrates a control algorithm to instruct through the onboard computer rules/logic in sequential steps including the adjusting of one or more positions and view angles of the cameras. The cameras also serve as real-time visual cues to the driver and the user entering the vehicle. The controller and the vehicle display unit are in electronic communication with the onboard computer and the controller is in electronic communication with the at least two multifunctional cameras actuator to vary camera position configured for each of the at least one operating mode(s).

Relative position (i.e., directional vectors) or simply the presence within a close proximity to the vehicle can also be established through a host sensor detecting at least one of the presence of the user entering the actual driven vehicle or the presence of the actual driven vehicle. The method of obtaining the location of actual driven vehicle is either an onboard global positioning system in the shared-use vehicle, a global positioning system on the user entering the shared-use vehicle, a known location of a host sensor detecting the presence of the shared-use vehicle, or a known location of a host sensor detecting the presence of the user entering the shared-use vehicle as known in the art.

The optimal embodiment of the invention integrates at least one geofence for a user onboard the shared-use vehicle (i.e., driver), a user offboard the vehicle (i.e., authorized user), or an automated robot operating as an authorized retriever to place or remove packages to/from the shared-use vehicle. The utilization of geofences is the preferred method of establishing authorization to an authorized retriever within the context of overlapping geofences.

The shared-use vehicle is also utilized to transport packages for strangers (i.e., non-related $3^{rd}$ parties, user void of an actual driver, or at least one user that is a non-driver) where the non-driver has a user compartment with a compartment volume for at least one package to be stored within the vehicle having a vehicle volume for the at least one storage compartment of the shared-use vehicle. The storage compartment can be designated on a fixed basis for the non-driver, or preferably can be assigned on a variable basis for the non-driver (i.e., user). The Package Management System "PMS" utilizes the aggregate volume of packages determined to be optimally transported along the determined routing of the vehicle by utilizing a vehicle sizing controller that determines a minimum size vehicle (which becomes assigned to an actual driver, and is referenced now as the actual driven vehicle). The PMS in conjunction with the vehicle sizing controller determines volume requirements for the user compartment volume of the non-driver, and the vehicle sizing controller determines an identifier for the actual driven vehicle selected, and the shared-use vehicle management system coordinates the convergence within an overlapping geofence at a concurrent time between the actual driven vehicle's geofence, the geofence of the at least one package to be stored within the actual driven vehicle, and an authorized retriever to move the at least one package to the actual driven vehicle.

The authorized retriever can be for any of the vehicle compartments such as the first compartment or the second compartment, with accessibility being exemplary as first compartment accessible by actual driver and second compartment accessible by authorized retriever. The compartment accessibility is in part controlled by the host sensor (with a known absolute or relative position) establishing the host location and a host geofence (determining a region beyond a pin-point resolution or allowing for acceptable location error tolerance). The vehicle's storage compartment also has a location and a geofence, such that the controller locks/unlocks through the lock actuator to enabled when the host geofence is overlapping with the at least one storage compartment geofence.

An important embodiment of the invention is the use of an offboard storage compartment, a queue for the vehicle selected, a queue for the package to be stored within at least one storage compartment on the vehicle, and a queue for the automated retriever to transport the package to/from the offboard storage compartment and the actual driven vehicle. The system accordingly delivers the package to any authorized receiver, even when the authorized receiver is an employee within the service company offering the share-use vehicle service. Packages being transported can have a wide range of monetary values, with the need to dynamically vary the rules of engagement to an authorized retriever to balance technology transparency, user ease, and package security. Thus a monetary value threshold is established for at least one package contained within the at least one storage compartment (or alternatively for the aggregate monetary value of all the packages within the at least one storage compartment. The rules of engagement include control of the lock actuator such as enabling the host geofence to have an authorization limit less than the monetary value threshold for the at least one package contained with the at least one storage compartment.

Another preferred embodiment of the invention is to utilize the multifunctional cameras with a forward facing field of view towards the vehicle in front of it to both coordinate the movement of all of the vehicles (i.e., actual driven vehicle, vehicle on any side(s) relative to the actual driven vehicle). For example the camera of a vehicle behind the actual driven vehicle can establish a visual record and detect the presence of the package within the at least one storage compartment of the actual driven vehicle. This feature is essential in minimizing theft or accidental loss of transported packages. Another essential feature of the invention is only enabling the lock actuator to be enabled when the host geofence is overlapping with the at least one storage compartment geofence. Yet another essential feature of the invention is to coordinate a series of queues to establish concurrent convergence of the actual driven vehicle, the actual transported package, and with/without the actual vehicle user to both expedite the process for all parties and to minimize lost time. It is understood that the system can minimize queue time for the user, for the driver, for the vehicle, and/or for the automated retriever system (i.e., robot as authorized package receiver). It is further understood that the system can alternatively maximize generated revenue, or optimize system performance through a convenience factor or weighted cost factor. Location and identifier of each package, each driver, each vehicle, and each user is essential for dynamic and variable operations such as externally influenced by human variability, traffic variability, and maintenance variability. It is imperative that the system operates safely, and each person whether a driver, user, authorized receiver, etc. preferably has a safety indicator visually present at any time required to maintain safe operations. The preferred embodiment requires an established bi-directional confirmation such as during the safe entry by the actual user into the actual driven vehicle.

It should be noted that in all embodiments of the invention, the user of a vehicle is not limited to the driver of the vehicle and may include vehicle passengers. In fact the core embodiments of the invention anticipate passengers that have no relationship to the driver, and further that the driver has no direct ownership or even indirect ownership relationship to the vehicle.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

I claim:

1. A shared-use vehicle management system comprised of at least two shared-use vehicles including a first vehicle and a second vehicle, wherein the first vehicle has at least one storage compartment, wherein the at least one storage compartment is a trunk at the rear of the first vehicle, wherein the first vehicle has a vehicle onboard computer system, wherein the second vehicle has a vehicle onboard computer system, wherein the shared-use vehicle management system is comprised of a computer, a picture database, and at least one camera that is offboard of the first vehicle, offboard camera is operable to scan the contents within the first vehicle's trunk and to take at least one picture of the first vehicle's trunk, a communications link to enable communication exchanging the at least one picture from the offboard camera to either the shared-use vehicle management system system or the first vehicle onboard computer system.

2. The shared-use vehicle management system according to claim 1 wherein the first vehicle has a container within the first vehicle trunk, wherein the shared-use vehicle management system is further comprised of an authorized retriever operable to remove the container from the first vehicle trunk.

3. The shared-use vehicle management system according to claim 1 wherein the offboard camera is operable to both determine the location of the at least two shared-use vehicles and to scan the contents within the first vehicle's trunk.

4. The shared-use vehicle management system according to claim 1 wherein the offboard camera is the second vehicle operable also as a forward facing camera operable to scan the contents within the first vehicle's trunk and to take at least one picture of the first vehicle's trunk.

5. A shared-use vehicle management system comprising at least two vehicles including a first vehicle and a second vehicle, whereby each of the two vehicles has an onboard computer and at least one onboard multifunctional camera, at least one vehicle location system operable to determine the location of the first vehicle and the location of the second vehicle, wherein the shared-use vehicle management system has a computer operable to control an automated movement of the location of the first vehicle relative to the location of the second vehicle and wherein the at least one onboard multifunctional camera takes a picture and communicates a movement command based on the picture and the location of the first vehicle relative to the second vehicle location.

6. The shared-use vehicle management system according to claim 5 further comprised of a host sensor having a host location and a host geofence, wherein the first vehicle multifunctional camera is a vehicle side camera operable as a rear facing camera to view a blindspot of the first vehicle and whereby the vehicle management system computer is operable to calculate an angle between the first vehicle and the second vehicle.

7. The shared-use vehicle management system according to claim 5 whereby the first vehicle multifunctional camera is a backward facing camera operable to view the second vehicle behind it and to calculate the distance between the first vehicle and the second vehicle and whereby the second vehicle multifunctional camera is a forward facing camera operable to validate the distance between the first vehicle and the second vehicle as calculated by either the vehicle management system camera or the first vehicle onboard computer.

8. The shared-use vehicle management system according to claim 5 wherein the first vehicle is represented by a geofence, wherein the second vehicle is represented by a geofence, and whereby the vehicle management system computer operates an automated movement system having a command language with one term selected from approaching, leaving, or overlapping for the interrelationship of the first vehicle geofence and the second vehicle geofence.

* * * * *